United States Patent
Suzuki et al.

(10) Patent No.: US 7,075,718 B2
(45) Date of Patent: Jul. 11, 2006

(54) TRANSPARENT SCREEN AND PROJECTION DISPLAY APPARATUS

(75) Inventors: Hiroshi Suzuki, Tokyo (JP); Takao Endo, Tokyo (JP); Shinsuke Shikama, Tokyo (JP); Shuso Wadaka, Tokyo (JP); Kohei Teramoto, Tokyo (JP); Kuniko Kojima, Tokyo (JP); Shigekazu Tsuda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 47 days.

(21) Appl. No.: 10/501,580

(22) PCT Filed: Nov. 26, 2002

(86) PCT No.: PCT/JP02/12335

§ 371 (c)(1),
(2), (4) Date: Jul. 14, 2004

(87) PCT Pub. No.: WO2004/049059

PCT Pub. Date: Jun. 10, 2004

(65) Prior Publication Data

US 2005/0105177 A1 May 19, 2005

(51) Int. Cl.
*G03B 27/60* (2006.01)
*G03B 21/56* (2006.01)
*G02B 27/10* (2006.01)
*G02B 3/08* (2006.01)

(52) U.S. Cl. .................. 359/457; 359/452; 359/454; 359/455; 359/460; 359/621; 359/742

(58) Field of Classification Search ........ 359/452–457, 359/460, 621, 622, 624, 742–743
See application file for complete search history.

(56) References Cited

U.S. PATENT DOCUMENTS 5,581,407 A * 12/1996 Mitani et al. ................ 359/619

(Continued)

FOREIGN PATENT DOCUMENTS

JP 59-111137 A 6/1984

(Continued)

OTHER PUBLICATIONS

Optical System of Ultral-Thin Real Projector Equipped With Refractive-Reflective Projection Optics, Shinsuke Shikama et al., Society for Information Display, 2002 International Symposium Digest of Technical Papers, vol., XXXIII, No. II, Boston, May 22-23, 2002, pp. 1250-1253.

*Primary Examiner*—W. B. Perkey
*Assistant Examiner*—Magda Cruz
(74) *Attorney, Agent, or Firm*—Birch, Stewart, Kolasch & Birch, LLP

(57) ABSTRACT

A transparent screen includes a refraction/total reflection plate in a form of a Fresnel lens, the refraction/total reflection plate having a sawtooth surface upon which light is incident and another surface via which the light exits, and an image formation/display plate for forming a projection image from the light that exits from the refraction/total reflection plate. Refraction slating surface portions each for refracting incident light towards the other surface of the refraction/total reflection plate, transmission slating surface portions each for making incident light pass therethrough, and total reflection slating surface portions each for reflecting incident light passing through one transmission slating surface portion towards the other surface of the refraction/total reflection plate being formed concentrically on the sawtooth surface of the refraction/total reflection plate.

15 Claims, 14 Drawing Sheets

U.S. PATENT DOCUMENTS 5,724,182 A * 3/1998 Mitani et al. ............... 359/457
5,914,809 A * 6/1999 Mitani et al. ............... 359/457
6,726,859 B1    4/2004 Suzuki et al.

FOREIGN PATENT DOCUMENTS

| JP | 59-119340 A | 7/1984 |
| JP | 2-18540 A | 1/1990 |
| JP | 5-204047 A | 8/1993 |
| JP | 5-289176 A | 11/1993 |
| JP | 6-160982 A | 6/1994 |
| JP | 6-273852 A | 9/1994 |
| JP | 2002-196413 A | 7/2002 |

* cited by examiner

FIG.6A

| SAMPLE ID | | #1 | #2 | #3 | #4 |
|---|---|---|---|---|---|
| STRUCTURE OF REFRACTION/ TOTAL REFLECTION PLATE | TRANSPARENT SUBSTRATE 18 | ACRYLIC | ACRYLIC | ACRYLIC | ACRYLIC |
| | COATINGS 16 AND 17 | WITHOUT | SINGLE-LAYER COATING | TWO-LAYER COATING | TWO-LAYER COATING |
| | LENTICULAR LENS UNIT 15 | WITHOUT | WITHOUT | WITHOUT | WITH |
| WHITE APERTURE BRIGHTNESS/ DOWNWARD GHOST LIGHT BRIGHTNESS | FRONT OBSERVATION | 116 | 298 | 529 | 361 |
| | PEEPING OBSERVATION | 68 | 195 | 413 | 423 |
| WHITE APERTURE BRIGHTNESS/UPWARD GHOST LIGHT BRIGHTNESS | | 230 | 189 | 246 | 328 |
| DEGREE OF DISTURBANCE BY DOUBLE IMAGE LIGHT | | × | × | × | ○ |

FIG.6B

| TRANSPARENT SUBSTRATE 18 | ACRYLIC, INDEX OF REFRACTION=1.52, THICKNESS=2.7mm |
|---|---|
| INDEX OF REFRACTION OF COATING MATERIAL | SINGLE-LAYER COATING; NL=1.43, TWO-LAYER COATING; NH=1.67/NL=1.43 |
| LIGHT-INCIDENCE-SIDE SAWTOOTH STRUCTURAL UNIT 19 | ULTRAVIOLET CURING RESIN, INDEX OF REFRACTION=1.55, PITCH P=0.11mm, THICKNESS=0.16mm |
| LENTICULAR LENS UNIT 15 | LENS PITCH: 89 μm, LENS SHAPE (ELLIPSE; DIAMETER IN THE UPWARD AND DOWNWARD DIRECTIONS: 0.17mm DIAMETER IN THE DIRECTION OF THE NORMAL TO LENTICULAR LENS UNIT 15: 0.14mm) |

FIG.6C

| DOWNWARD GHOST LIGHT (FRONT OBSERVATION) | DISPLAY WHITE APERTURE (OF 24 SQUARE CENTIMETERS) AT CENTER OF SCREEN, MEASURE BRIGHTNESS OF WHITE APERTURE FROM POSITION AT DISTANCE OF 1.6m FROM SCREEN IN DIRECTION OF NORMAL TO SCREEN, AND MEASURE BRIGHTNESS OF DOWNWARD GHOST RAYS OF LIGHT IN VICINITY OF CENTER OF LOWER SIDE OF SCREEN |
|---|---|
| DOWNWARD GHOST LIGHT (PEEPING OBSERVATION) | DISPLAY WHITE APERTURE (OF 24 SQUARE CENTIMETERS) AT CENTER OF SCREEN, MEASURE BRIGHTNESS OF WHITE APERTURE FROM POSITION LOCATED AT DISTANCE OF 1.75m FROM SCREEN IN DIRECTION OF NORMAL TO SCREEN AND LOCATED IN SLANTING UPWARD DIRECTION HAVING 20-DEGREE ANGLE, AND MEASURE BRIGHTNESS OF DOWNWARD GHOST RAYS OF LIGHT IN VICINITY OF CENTER OF LOWER SIDE OF SCREEN |
| UPWARD GHOST LIGHT | DISPLAY WHITE APERTURE (OF 12 SQUARE CENTIMETERS) AT CENTER OF LOWER SIDE OF SCREEN, OBSERVE BRIGHTNESS OF WHITE APERTURE FROM POSITION IN DIRECTION OF NORMAL TO SCREEN, AND MEASURE BRIGHTNESS OF UPWARD GHOST RAYS OF LIGHT AT BOTH POSITIONS APART FROM CENTER OF SCREEN BY 18 CENTIMETERS IN RIGHTWARD AND LEFTWARD DIRECTIONS, RESPECTIVELY |
| DOUBLE IMAGE LIGHT | DISPLAY CROSS HATCHING IMAGE HAVING CROSSING LINES AT PITCHES OF 24mm ON SCREEN IN ORDER FOR WATCHER TO VISUALLY EVALUATE DOUBLE IMAGE RAYS OF LIGHT IN VICINITY OF CENTER OF LOWER SIDE OF SCREEN |

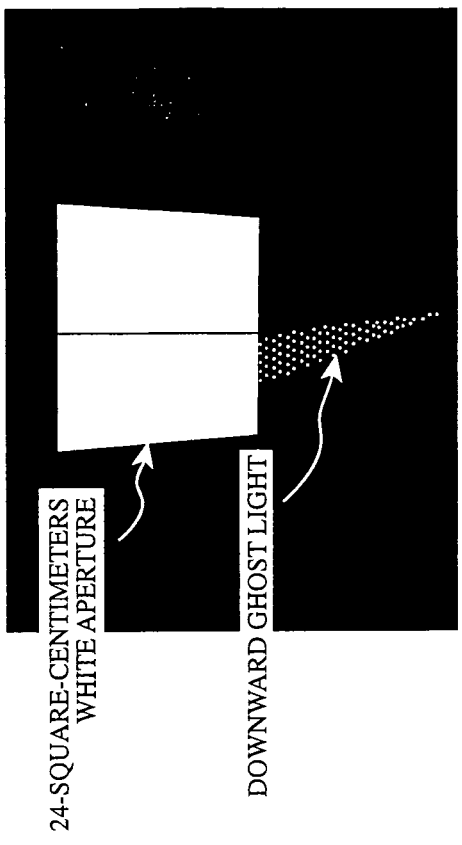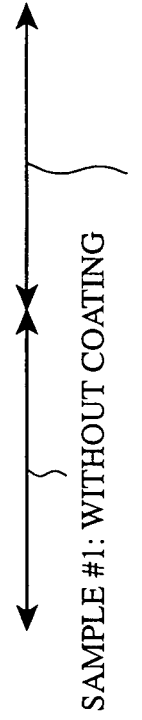
FIG.7A
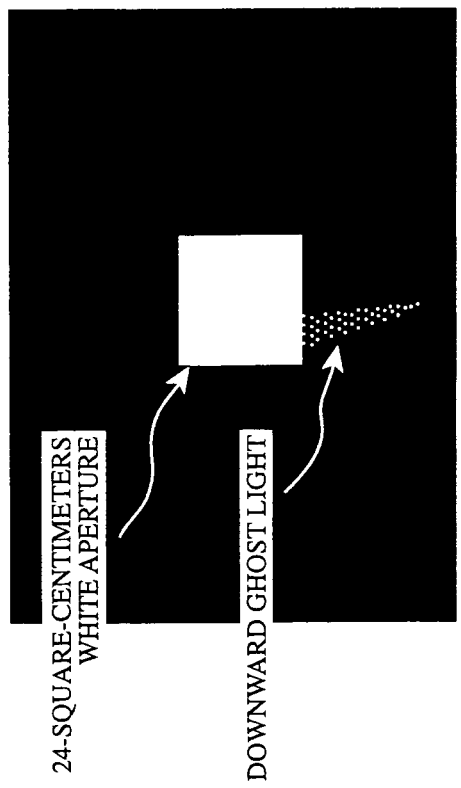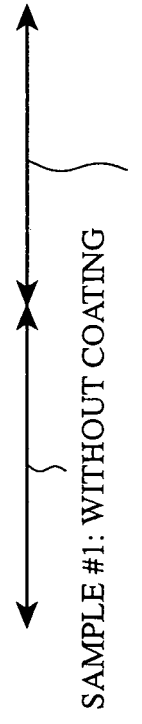
FIG.7B

SAMPLE #4: DOUBLE-SIDED TWO-LAYER COATING + LIGHT-EMITTING-SIDE LENTICULAR LENS

SAMPLE #3: DOUBLE-SIDED TWO-LAYER COATING

SAMPLE #1: WITHOUT COATING

TRANSPARENT SCREEN AND PROJECTION DISPLAY APPARATUS

FIELD OF THE INVENTION

The present invention relates to a transparent screen and a projection display apparatus that uses this transparent screen.

BACKGROUND OF THE INVENTION

There has been developed a transparent screen that uses, as one convex lens, a Fresnel lens including a number of concentric circular members and that focuses a beam of light emitted out of the Fresnel lens onto an image formation/display plate so as to obtain an image. For example, international patent publication No. WO02/27399 discloses a transparent screen provided with a refraction/total reflection plate (i.e., a Fresnel lens) which has a portion for refracting a ray of light to be projected and another portion for totally reflecting the ray of light to be projected, and an image formation/display plate for focusing a ray of light emitted out of the refraction total reflection plate so as to obtain a projected image.

A refraction/total reflection plates disclosed by international patent publication No. WO02/27399 has a number of slanting parts formed on a surface thereof upon which the ray of light to be projected is incident. Those slanting parts include refraction slanting parts each for refracting an incident ray of light to be projected so as to make it travel towards the image formation/display plate. Those slanting parts also include total reflection slanting parts each for totally reflecting a ray of light to be projected passing through a transmission slanting part located just below the total reflection slanting part and entering the inside of the Fresnel lens, and for then making the ray of light to be projected travel towards the image formation/display plate. In other words, each total reflection slanting part reflects the incident ray of light to be projected, which travels the inside of the Fresnel lens, toward the inside of the Fresnel lens. In the Fresnel lens, scattering particles which exhibit weak dispersion characteristics are dispersedly disposed, and the viewing angle of the display image light is mainly determined by a combination of the dispersion characteristics and dispersion characteristics which the image formation/display plate exhibits.

"Shikama, S. et al., Optical System of Ultra-Thin Rear Projector Equipped with Refractive-Reflective Projection Optics, SID2002 Digest, 46.2, (2002)" discloses a projection display apparatus using such a prior art type of transparent screen. Since this reference is thus cited in this specification, it can be assumed that the written contents of this reference make a part of disclosure of this patent application.

The inventors of the present application found out by both experiment and light ray tracing simulation that obstruction light was visually recognized in addition to effective beams of light which contribute to a regular projected image display in the transparent screen using the above-mentioned refraction/total reflection plate. Therefore, the transparent screen has been in need of improvements in the obstruction light occurrence phenomena in order to produce a high-definition image display. For example, although in each of the total reflection slanting parts, most of a ray of light to be projected incident upon a corresponding transmission slanting part should pass through the transmission slanting part and then enter the inside of the Fresnel lens, a part of the incident ray of light is reflected by the transmission slanting part and then becomes a downward ghost ray of light after passing through an unexpected path, so that a watcher can visually identify the downward ghost ray of light. In addition, while each of the refraction slanting parts refracts an incident ray of light to be projected and makes it travel towards the image formation/display plate, a part of the incident ray of light to be projected can enter an ineffective facet part that is located directly under and is adjacent to the refraction slating surface portion and can become an upward ghost ray of light or double image light after passing through an unexpected path, so that a watcher can visually identify the upward ghost ray of light or double image light.

DISCLOSURE OF THE INVENTION

The present invention is made in order to solve the above-mentioned problems, and it is therefore an object of the present invention to provide a refraction/total reflection plate transparent screen that can reduce obstruction light and provide a high-definition projected image, and a projection display apparatus using this refraction/total reflection plate transparent screen.

In accordance with the present invention, there is provided a transparent screen including: a refraction/total reflection plate in a form of a Fresnel lens, the refraction/total reflection plate having a sawtooth light-incidence-side surface upon which light to be projected is incident, and a light-emitting-side surface via which the light to be projected exits; and an image formation/display plate for forming a projection image from the light that exits from the refraction/total reflection plate, a plurality of refraction slating surface portions each for refracting an incident ray of light to be projected towards the light-emitting-side surface of the refraction/total reflection plate, a plurality of transmission slating surface portions each for making an incident ray of light to be projected pass therethrough, and a plurality of total reflection slating surface portions each for reflecting an incident ray of light passing through one of the plurality of transmission slating surface portions towards the light-emitting-side surface of the refraction/total reflection plate being formed concentrically on the sawtooth light-incidence-side surface of the refraction/total reflection plate, and the refraction/total reflection plate being formed of a transparent material in which no scattering particles are dispersedly disposed. Therefore, since the refraction/total reflection plate is formed of a transparent material in which no scattering particles are dispersedly disposed, the transparent screen can prevent generation of diffused and reflected light from beams of light which are reflected from the light-emitting-side surface of the refraction/total reflection plate, thereby reducing the intensity of obstruction rays of light.

In accordance with the present invention, there is provided a projection display apparatus including: a projection optical system for emitting out a beam of light to be projected that enlarges as it travels; the transparent screen according to the present invention; and a plane mirror for reflecting the beam of light to be projected from the projection optical system toward the transparent screen, wherein the projection optical system is located between the transparent screen and the plane mirror, and below them. Therefore, the projection display apparatus can reduce an adverse effect of obstruction rays of light by the synergistic effect with the transparent screen. In addition, the rear projection display apparatus can be thinned.

BRIEF DESCRIPTION OF THE FIGURES

FIG. 6A is a chart showing results of experiments conducted for checking an effect of the transparent screen according to embodiment 1 of the present invention;

FIG. 6B is a chart showing conditions on which refraction/total reflection plates used for the experiments are formed;

FIG. 6C is a chart showing conditions on which measurements are carried out for the experiments;

FIGS. 7A and 7B are diagrams of photographs that demonstrate an effect of the transparent screen according to embodiment 1 of the present invention;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
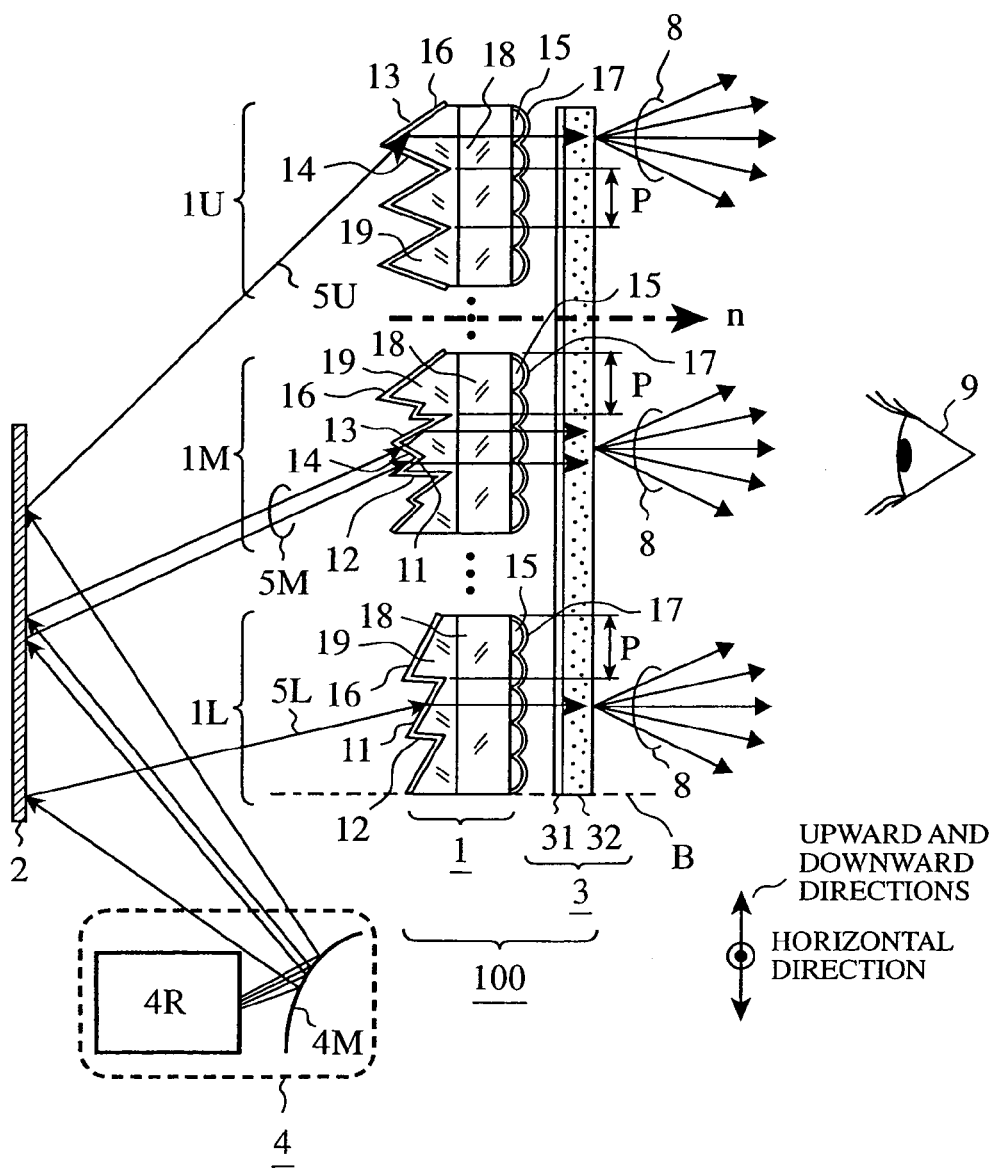
FIG. 1 is a schematic diagram showing a projection display apparatus provided with a transparent screen according to embodiment 1 of the present invention.
Figure 2:
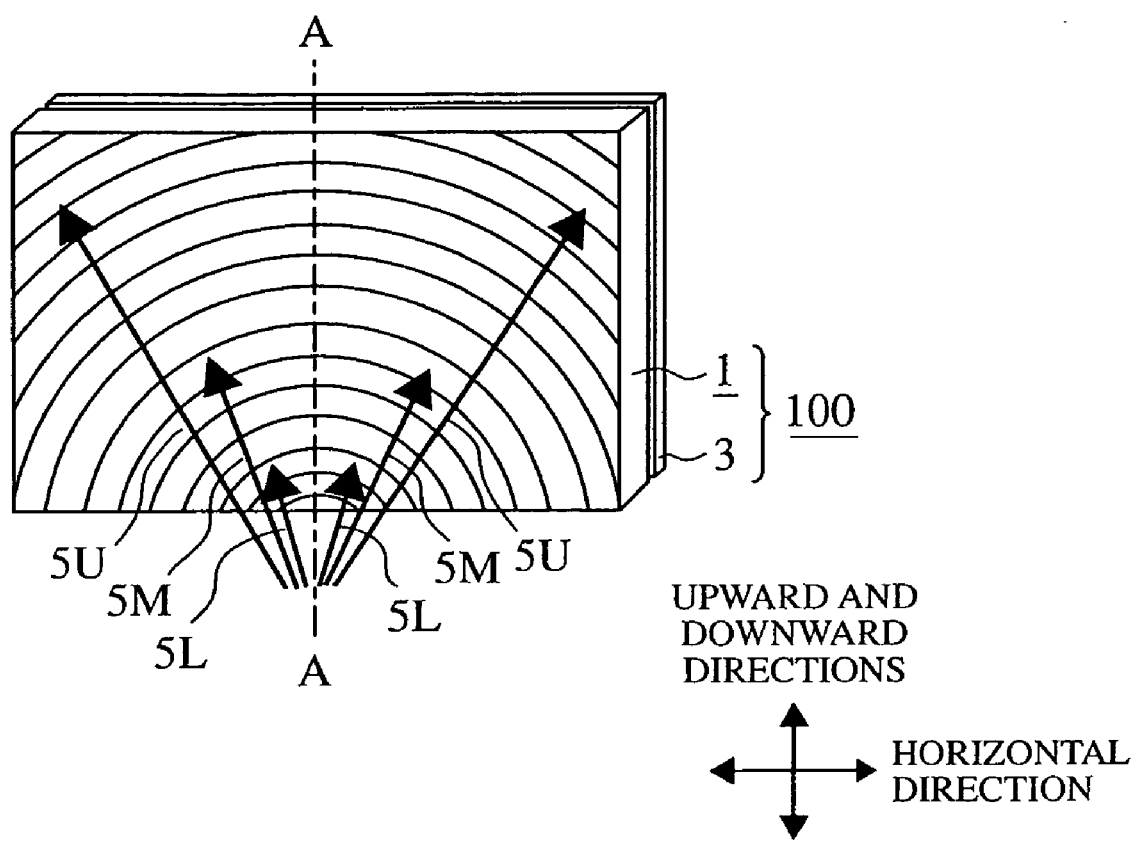
FIG. 2 is a perspective diagram showing the transparent screen according to the present invention when viewed from the back thereof.

FIG. 1 is a schematic diagram showing a projection display apparatus provided with a transparent screen 100 according to embodiment 1 of the present invention. As shown in FIG. 1, this projection display apparatus is provided with the transparent screen 100, a plane mirror 2, and a projection optical system 4. FIG. 2 is a perspective diagram showing the transparent screen 100 when viewed from the back thereof, and the plane mirror 2 and the projection optical system 44 are not illustrated in this figure. A vertical cross-sectional view of the transparent screen 100 is shown in FIG. 1, the view being taken along a central line A—A shown in FIG. 2 and passing through the transparent screen 100 in a vertical direction.

The plate-shaped plane mirror 2 and the nearly plate-shaped transparent screen 100 are stood perpendicularly and are arranged in parallel with each other. When viewed in a horizontal plane, the projection optical system 4 is located between the plane mirror 2 and the transparent screen 100. The projection optical system 4 is also located below the plane mirror 2 and the transparent screen 100. The projection optical system 4 has a refraction optical system 4R having a light source, and a convex mirror 4M for reflecting a beam of light emitted out of the refraction optical system 4R. The beam of light reflected by a convex surface of the convex mirror 4M is enlarged in size by the curve of the convex mirror 4M as it travels, and is made to further travel toward the plane mirror 2 and in a slanting upward direction. The plane mirror 2 has a reflective surface opposite to the transparent screen 100, for reflecting the light beam emitted out of the projection optical system 4 toward the transparent screen 100 and in a slanting upward direction. For the sake of convenience, the beam of light to be projected which travels towards the transparent screen 100 can be divided into rays of light to be projected 5U which are incident upon an upper portion of the transparent screen 100, rays of light to be projected 5M which are incident upon a central portion of the transparent screen 100, and rays of light to be projected 5L which are incident upon a lower portion of the transparent screen 100. As shown in the figure, by thus arranging the projection optical system 4 between the plane mirror 2 and the transparent screens 100 and below them, it is possible to reduce the thickness of the projection display apparatus (i.e., a rear projector).

As shown in FIG. 2, the transparent screen 100 is provided with the rectangular refraction/total reflection plate 1 and an image formation/display plate which is roughly equal to the rectangular refraction/total reflection plate 1 in shape and size. The refraction/total reflection plate 1 is formed in the form of a Fresnel lens, and has a number of concentric circular members formed on a light-incidence-side surface thereof upon which the light ray emitted from the plane mirror 2 is incident (the plurality of concentric circular members are sawtooth in cross section as shown in the cross-sectional view of FIG. 1). The opposite surface of the refraction/total reflection plate 1 is flat-shaped. A line B (shown in FIG. 1) shows a common axis of the sawtooth circular members formed on the light-incidence-side surface of the refraction/total reflection plate 1, the common axis being located in the vicinity of a lower side of the refraction/total reflection plate 1.

The whole of the refraction/total reflection plate 1 having such the light-incidence sawtooth surface can be formed of a transparent material, such as a glass or acrylic. However, in view of the difficulty of the fabrication of such a sawtooth structure, it is preferable to form a sawtooth structural unit (i.e., a refraction/total reflection structural unit) 19 on one surface of a first transparent plate-shaped substrate 18, the sawtooth structure unit being formed of a material different from that of which the first transparent substrate 18 is formed. As a result, the refraction/total reflection plate 1 can be easily manufactured in quantity. For example, when the first transparent plate-shaped substrate 18 is formed of acrylic, the sawtooth structural unit 19 made of an ultraviolet-rays (UV) curing resin or another resin can be formed on one surface of the first transparent substrate 18. It is preferable that the first transparent substrate 18 and the sawtooth structural unit 19 have indexes of refraction which are close to each other as much as possible. When the first transparent substrate 18 is formed of acrylic, the first transparent substrate 18 can be easily acquired or can be manufactured at a low cost, and can be reduced in weight. In contrast, when the first transparent substrate 18 is formed of a glass, the transparent substrate 18 can be easily acquired or can be manufactured at a low cost, and the flatness of the first transparent substrate 18 can be improved.

As shown in FIG. 1, in the refraction/total reflection plate 1, the sawtooth surface upon which the beam of light from the plane mirror 2 is incident is covered by a reflection reduction coating layer 16 for reducing the reflectance of visible rays of light incident upon the refraction/total reflection plate 1. The reflection reduction coating layer 16 can be a single-layer coating which consists of a single layer or can be a two-layer coating which consists of two layers. In a case where the reflection reduction coating layer 16 can be a single-layer coating, it is preferable that the reflection reduction coating layer 16 is formed of a material having a lower index of refraction than that of a material of which the refraction/total reflection plate 1 is formed. For example, when the refraction/total reflection plate 1 is formed of a glass, although MgF can be selected as the material of which the reflection reduction coating layer 16 is formed, the material of which the reflection reduction coating layer 16 is not limited to MgF.

In a case where the reflection reduction coating layer 16 can be a two-layer coating, it is preferable that the reflection reduction coating layer 16 has a first layer which is coated on the refraction/total reflection plate 1 and formed of a material having a higher index of refraction than that of the material of which the refraction/total reflection plate 1 is formed, and a second layer which is coated on the first layer and is formed of a material having a lower index of refraction than that of the material of which the refraction/total reflection plate 1 is formed. For example, when the refraction/total reflection plate 1 is formed of a glass, although MgF or $Al_2O_3$ can be selected as the material of which the first layer is formed and $MgF_2$ can be selected as the material of which the second layer is formed, the material of which the first layer is formed and the material of which the second layer is formed are not limited to MgF or $Al_2O_3$ and $MgF_2$, respectively.

A first lenticular lens unit 15 which consists of an array of two or more cylindrical lenses is arranged on the other surface of the refraction/total reflection plate 1 from which rays of light passing through the refraction/total reflection plate 1 exit. Each of the plurality of cylindrical lenses which constitute the first lenticular lens unit 15 has a shape corresponding to one of halves into which a cylinder or an elliptic cylinder is divided by a plane parallel to the axis of the cylinder, and the plurality of cylindrical lenses are preferably equal in shape and size. Each of the plurality of cylindrical lenses has a flat surface which is contact with and adhered to the refraction/total reflection plate 1 and which is extending in a horizontal direction (i.e., in a direction perpendicular to the page of FIG. 1). Since these cylindrical lenses are arranged at predetermined pitches and in both upward and downward directions, the right-side light-emitting-side surface of the first lenticular lens unit 15 has undulations formed at predetermined pitches and in both the upward and downward directions. Therefore, the rays of light emitted out of the refraction/total reflection plate 1 are diffused in both the upward and downward directions by the plurality of cylindrical lenses.

The first lenticular lens unit 15 is formed of a transparent material. In view of the difficulty of the fabrication of the refraction/total reflection plate 1, the first lenticular lens unit 15 made of a material different from that of which the first transparent substrate 18 is made is preferably formed on the other surface of the first transparent plate-shaped substrate 18. As a result, the refraction/total reflection plate 1 can be easily manufactured in quantity. For example, when the first transparent plate-shaped substrate 18 is formed of acrylic, the first lenticular lens unit 15 made of a UV curing resin or another resin can be formed on the other surface of the first transparent substrate 18. It is preferable that the first transparent substrate 18 and the first lenticular lens unit 15 have indexes of refraction that are close to each other as much as possible.

The first lenticular lens unit 15 has a light-emitting-side surface which is coated with a reflection reduction coating layer 17. This reflection reduction coating layer 17 reduces the reflectance of visible rays of light incident upon the first lenticular lens unit 15 from a right-side part of the figure, i.e., from outside the refraction/total reflection plate 1. The reflection reduction coating layer 17 can be a single-layer coating which consists of a single layer, or can be a two-layer coating which consists of two layers. In a case where the reflection reduction coating layer 17 is a single-layer coating, it is preferable that the reflection reduction coating layer 17 is formed of a material having a lower index of refraction than that of the material of which the first lenticular lens unit 15 is formed. In a case where the reflection reduction coating layer 17 can be a two-layer coating, it is preferable that the reflection reduction coating layer 17 has a first layer which is coated on the first lenticular lens unit 15 and formed of a material having a higher index of refraction than that of the material of which the first lenticular lens unit 15 is formed, and a second layer which is coated on the first layer and is formed of a material having a lower index of refraction than that of the material of which the first lenticular lens unit 15 is formed.

According to another embodiment of the present invention, instead of the first lenticular lens unit 15, the reflection reduction coating layer 17 can be formed directly on the other surface of the refraction/total reflection plate 1 via which the incident beams of light exit. However, as will be explained below in this embodiment 1, it is preferable that the first lenticular lens unit 15 is disposed on the other surface of the refraction/total reflection plate 1 via which the incident beams of light exit in order to reduce double image light.

The image formation/display plate 3 has a second plate-shaped transparent substrate 32 that is arranged in parallel with the light-emitting-side surface of the refraction/total reflection plate 1, and a second lenticular lens unit 31. The second transparent substrate 32 has a surface upon which the beams of light from the refraction/total reflection plate are incident and on which the second lenticular lens unit 31 consisting of an array of two or more cylindrical lenses is arranged. Each of the plurality of cylindrical lenses which constitute the second lenticular lens unit 31 has a shape corresponding to one of halves into which a cylinder or an elliptic cylinder is divided by a plane parallel to the axis of the cylinder, and the plurality of cylindrical lenses are preferably equal in shape and size. Each of the plurality of cylindrical lenses has a flat surface which is contact with and adhered to the second transparent substrate 32 and which is extending in both the upward and downward directions. Since these cylindrical lenses are arranged at predetermined pitches and in a horizontal direction, the right-side light-emitting-side surface of the second lenticular lens unit 31 has undulations formed at predetermined pitches and running in the horizontal direction. Therefore, a ray of light emitted out of the second lenticular lens unit 31 is diffused in the horizontal direction by each of the plurality of cylindrical lenses. In other words, the second lenticular lens unit 31 controls the orientation of rays of light for image display.

The second transparent substrate 32 and the second lenticular lens unit 31 can be integrally formed of a transparent material, such as a glass or acrylic. In view of the difficulty of the fabrication of a sawtooth structure, a sawtooth structural unit made of a material different from that of which the second transparent substrate 32 is made is preferably formed on the light-incidence-side surface of the second plate-shaped transparent substrate 32. As a result, the image formation/display plate 3 can be easily manufactured in quantity. For example, when the second plate-shaped transparent substrate 32 is formed of acrylic, the second lenticular lens unit 31 made of a UV curing resin or another resin can be formed on the light-incidence-side surface of the second transparent substrate 32. It is preferable that the second transparent substrate 32 and the second lenticular lens unit 31 have indexes of refraction that are close to each other as much as possible.

Light scattering particles each of which is made of a well-known material are dispersedly disposed within the transparent substrate 32, or in the vicinity of a surface of the transparent substrate 32. The second transparent substrate 32 thus serves as a light scattering plate for forming a projected image because of the scattering particles disposed therein.

Next, the shape of the refraction/total reflection plate 1 according to this embodiment will be explained more concretely. The refraction/total reflection plate 1 includes a refraction region 1L that constitutes a lower portion thereof (i.e., an inner-side portion in the vicinity of the common axis line B of the sawtooth circular members), a refraction/total reflection region 1M that constitutes a central portion thereof, and a total reflection region 1U that constitutes an upper portion thereof (i.e., a peripheral portion that is the farthest away from the common axis line B). Actually, the sawtooth circular members are continuously formed at predetermined pitches throughout those regions 1L, 1M, and 1U. In FIG. 1, the sawtooth circular members are partially illustrated in each of the regions 1L, 1M, and 1U in order to facilitate the understanding of the sawtooth structure. After reflected by the convex mirror 4M, the beam of light to be projected, which is emitted out of the refraction optical system 4R of the projection optical system 4, is incident upon the transparent screen 100, as rays of light to be projected 5L that are reflected by the plane mirror 2 and are then incident upon the refraction region 1L which is the lower portion of the refraction/total reflection plate 1, rays of light to be projected 5M that are incident upon the refraction/total reflection region 1M, and rays of light to be projected 5U that are incident upon the total reflection region 1U.

The refraction region 1L that is the inner-side portion of the refraction/total reflection plate 1 has a plurality of refraction slanting surface portions 11 and a plurality of ineffective facet surface portions 12 each of which is adjacent to one refraction slating surface portion 11. A plurality of sets of one refraction slating surface portion 11 and one ineffective facet surface portion 12 are alternately arranged in a line so that those surface portions are running at the predetermined pitches of P. Each of the plurality of sets of one refraction slating surface portion 11 and one ineffective facet surface portion 12 constitutes a sawtooth circular member formed on the light-incidence-side surface of the refraction/total reflection plate 1. Each of the plurality of refraction slanting surface portions 11 is inclined against the common axis line B of the plurality of circular members and has an outline shape corresponding to a part of the slating surface portion of a truncated cone whose vertex is located above the light-incidence-side surface of the refraction/total reflection plate 1, whereas each of the plurality of ineffective facet surface portions 12 is parallel to the common axis line B of the plurality of circular members and has a cylindrical outline shape. A ray of light to be projected 5L emitted out of the projection optical system 4 is refracted by a refraction slating surface portion 11 and is made to travel through the refraction/total reflection plate 1 and along the direction of the normal n to the refraction/total reflection plate 1 (i.e., the normal commonly to the refraction/total reflection plate 1 and the image formation/display plate 3 which constitute the transparent screen 100). Therefore, each of the plurality of refraction slanting surface portions 11 can refract and introduce incident light from outside the refraction/total reflection plate 1 into the inside of the refraction/total reflection plate 1.

The total reflection region 1U which is the peripheral portion of the refraction/total reflection plate 1 has two or more total reflection slating surface portions 13 and two or more transmission slating surface portions 14 each of which is adjacent to a total reflection slating surface portion 13. A plurality of sets of one total reflection slating surface portion 13 and one transmission slating surface portion 14 are alternately arranged in a line so that those surfaces are running at the same predetermined pitches of P at which the plurality of refraction slating surface portions 11 and the plurality of ineffective facet surfaces 12 are running in the refraction region 1L. Each set of one total reflection slating surface portion 13 and one transmission slating surface portion 14 also constitutes a sawtooth circular member formed on the light-incidence-side surface of the refraction/total reflection plate 1. Each of the plurality of total reflection slating surface portions 13 is inclined against the common axis line B of the plurality of circular members and has an outline shape corresponding to a part of the slating surface of a truncated cone whose vertex is located above the light-incidence-side surface of the refraction/total reflection plate 1, whereas each of the plurality of transmission slating surface portions 14 is inclined against the common axis line B of the plurality of circular members and has an outline shape corresponding to a part of the slanting surface of a truncated cone whose vertex is located above the light-emitting-side surface of the refraction/total reflection plate 1. A ray of light to be projected 5U that is emitted out of the projection optical system 4 and is then incident upon a transmission slating surface portion 14 is reflected by a corresponding total reflection slating surface portion 13 and is made to travel through the refraction/total reflection plate 1 and along the direction of the normal n after refracted by the transmission slating surface portion 14. Therefore, while each of the plurality of transmission slating surface portions 14 can refract and introduce incident light from outside the refraction/total reflection plate 1 into the inside of the refraction/total reflection plate 1, each of the plurality of total reflection slating surface portions 13 can reflect incident light passing through the inside of the refraction/total reflection plate 1 to the inside of the refraction/total reflection plate 1.

The refraction/total reflection region 1M has two or more refraction slating surface portions 11, two or more ineffective facet surfaces 12, two or more transmission slating surface portions 14, and two or more total reflection slating surface portions 13. Each of a plurality of sets of one refraction slating surface portion 11, one ineffective facet surface portion 12, one transmission slating surface portion 14, and one total reflection slating surface portion 13 constitutes a composite member. In each composite member, a transmission slating surface portion 14 is disposed adjacently to and immediately inside a total reflection slating surface portion 13, a refraction slating surface portion 11 is disposed adjacently to and immediately inside the transmission slating surface portion 14, an ineffective facet surface portion 12 is disposed adjacently to and immediately inside the refraction slating surface portion 11, and another total reflection slating surface portion 13 included in an adjacent composite member is disposed adjacently to and immediately inside the ineffective facet surface portion 12. Thus, in the refraction/total reflection region 1M, a plurality of composite members are continuously arranged in a line and at the same predetermined pitches of P at which the plurality of refraction slating surface portions 11 and the plurality of ineffective facet surfaces 12 are arranged in the refraction region 1L.

A ray of light to be projected 5M that is emitted out of the projection optical system 4 and is then incident upon a refraction slating surface portion 11 of the refraction/total reflection region 1M is refracted by the refraction slating surface portion 11 and is them made to travel through the inside of the refraction/total reflection plate 1 and along the direction of the normal n. A ray of light to be projected 5M that is emitted out of the projection optical system 4 and is then incident upon a transmission slating surface portion 14 is reflected by a corresponding total reflection slating surface portion 13 and is then made to travel through the inside of the refraction/total reflection plate 1 and along the direction of the normal n after refracted by the transmission slating surface portion 14. Each of the plurality of refraction slating surface portions 11 and each of the plurality of ineffective facet surfaces 12 in the refraction/total reflection region 1M have the same shapes and functions as each of the plurality of refraction slating surface portions 11 and each of the plurality of ineffective facet surfaces 12 in the refraction region 1L, respectively. On the other hand, each of the plurality of total reflection slating surface portions 13 and each of the plurality of transmission slating surface portions 14 in the refraction/total reflection region 1M have the same shapes and functions as each of the plurality of total reflection slating surface portions 13 and each of the plurality of transmission slating surface portions 14 in the total reflection region 1U, respectively. In each composite member located in a lower or inner portion of the refraction/total reflection region 1M, the refraction slating surface portion 11 and the ineffective facet surface portion 12 occupy a larger space than the total reflection slating surface portion 13 and the transmission slating surface portion 14. In contrast, in each composite member located in an upper or outer portion of the refraction/total reflection region 1M, the total reflection slating surface portion 13 and the transmission slating surface portion 14 occupy a larger space than the refraction slating surface portion 11 and the ineffective facet surface portion 12. In other words, each composite member located in the lower or inner portion of the refraction/total reflection region 1M has a shape that approximates to that of each set of one refraction slanting surface and one ineffective facet surface in the refraction region 1L, whereas each composite member located in the upper or outer portion of the refraction/total reflection region 1M has a shape that approximates to that of each set of one total reflection slanting surface and one transmission slanting surface in the total reflection region 1U.

In the volume of the refraction/total reflection plate 1, no scattering particles are dispersedly disposed or scattering particles are removed as much as possible. Therefore, the rays of light to be projected 5L, 5M, and 5U introduced into the inside of the refraction/total reflection plate 1 (containing the first transparent substrate 18) travel the inside of the refraction/total reflection plate 1 along the direction of the normal n to the refraction/total reflection plate 1.

In case where the first lenticular lens unit 15 is disposed on the refraction/total reflection plate 1, the rays of light which exit from the refraction/total reflection plate 1 are diffused in both the upward and downward directions by the first lenticular lens unit 15. The outgoing rays of light are further diffused horizontally by the second lenticular lens unit 31 and are also diffused by the scattering particles dispersedly disposed in the second transparent substrate 32, and are then visually identified by a watcher 9 as on-screen image rays of light 8.

Next, an effect of the transparent screen according to embodiment 1 of the present invention that is constructed as mentioned above will be explained.

Figure 3:
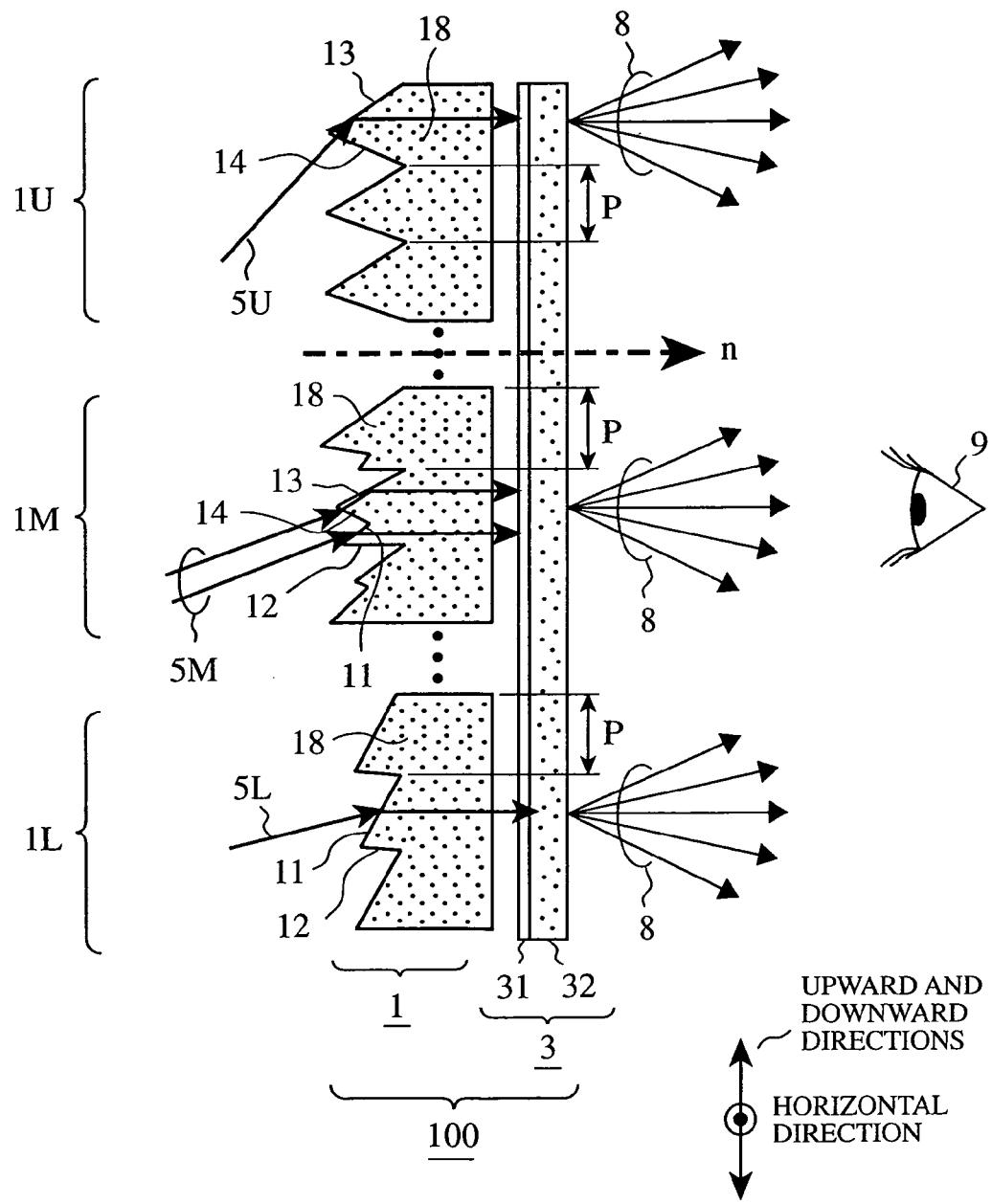
FIG. 3 is a vertical-cross-sectional view of a transparent screen of a comparative example.
Figure 4:
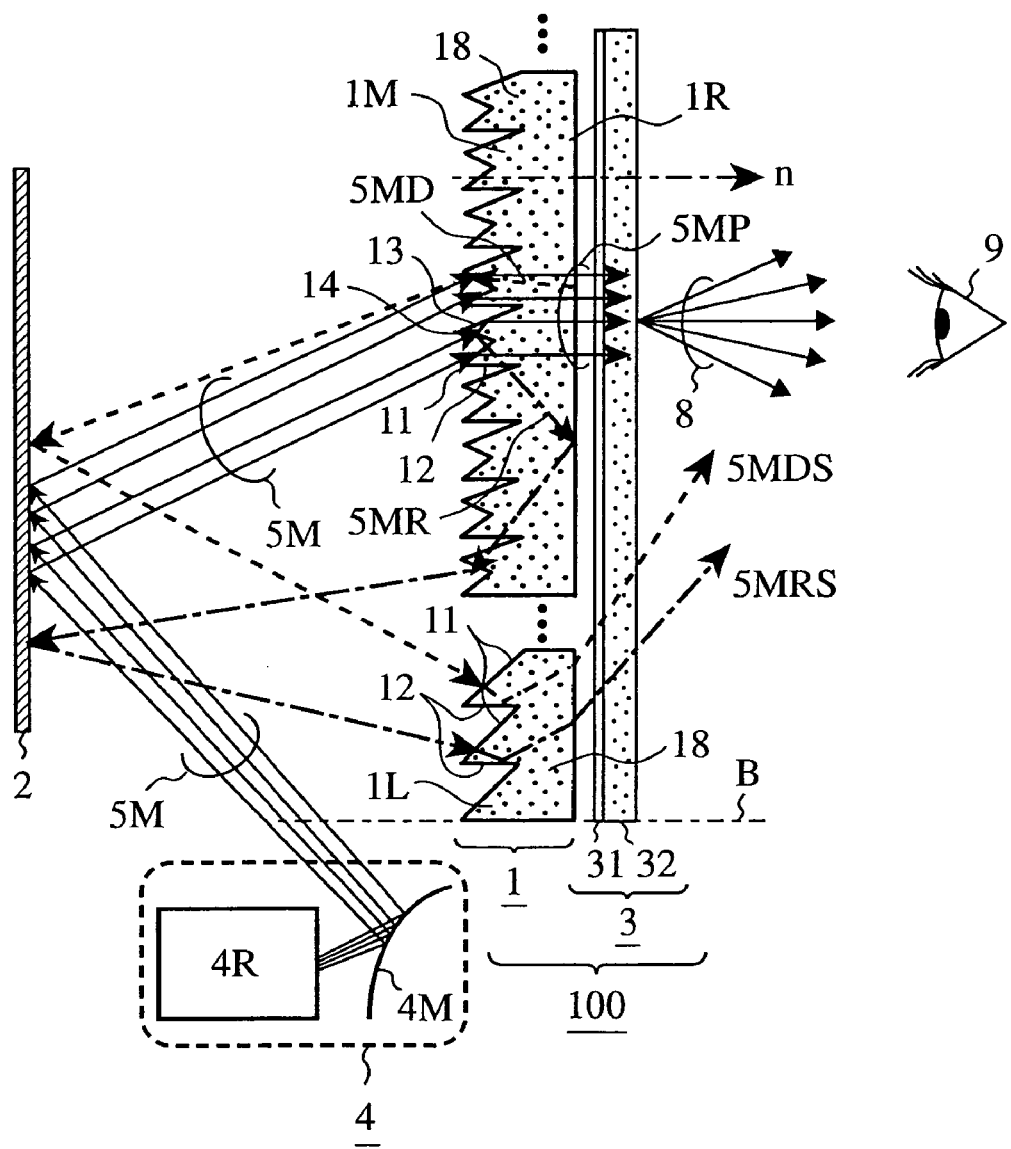
FIG. 4 is a diagram showing a mechanism for generation of downward ghost rays of light in the transparent screen of FIG. 3.
Figure 5:
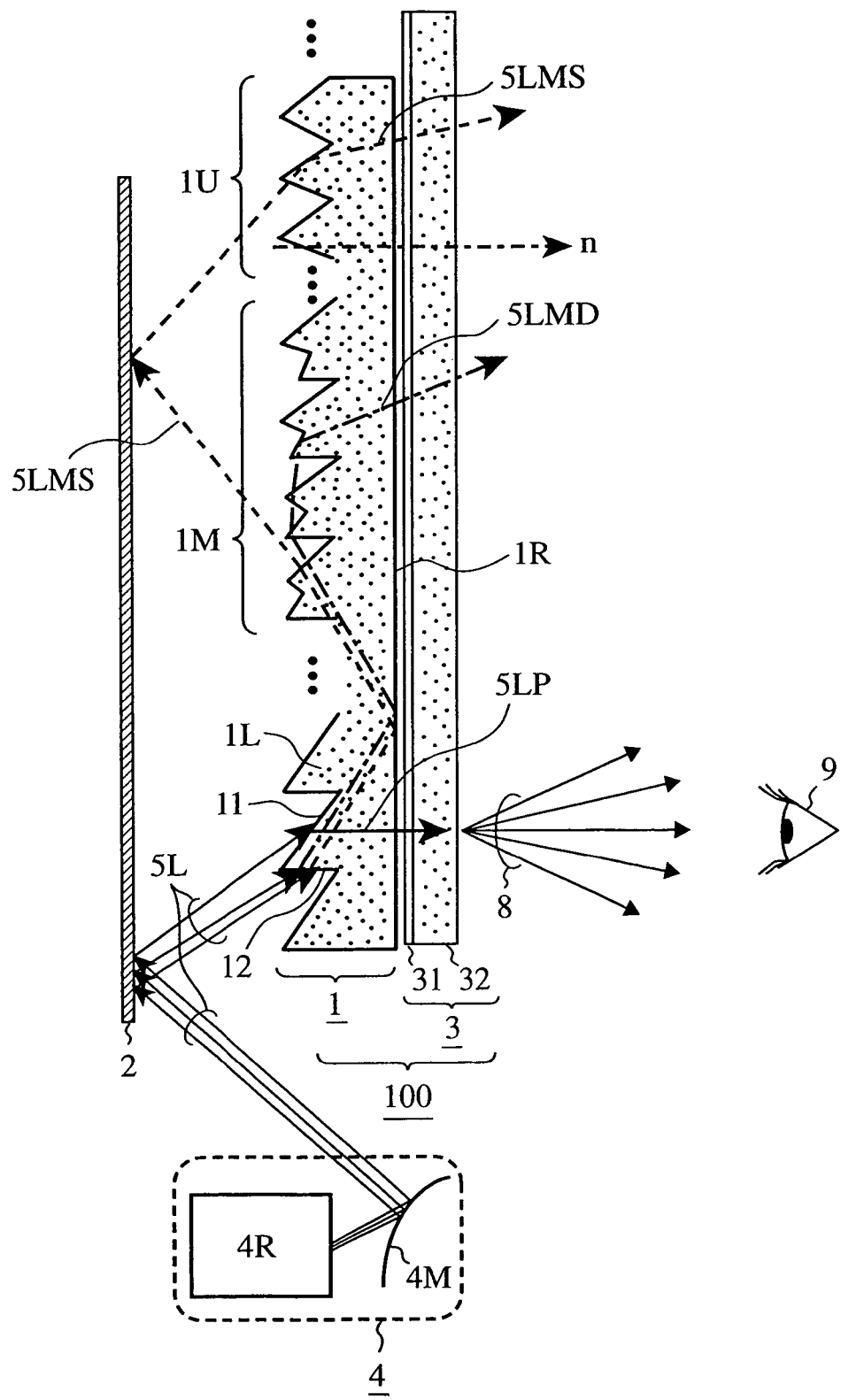
FIG. 5 is a diagram showing a mechanism for generation of upward ghost rays of light and double image rays of light in the transparent screen of FIG. 3.

As a comparative example, a transparent screen 100 as shown in FIGS. 3 to 5 will be explained. As shown in these figures, the transparent screen 100 of this comparative example is provided with a refraction/total reflection plate 1 without the reflection reduction coating layer 16, the first lenticular lens unit 15, and the reflection reduction coating layer 17 as shown in FIG. 1. In the volume of the refraction/total reflection plate 1, scattering particles that exhibit weak light scattering characteristics are dispersedly disposed, and the viewing angle of on-screen image rays of light 8 in both the upward and downward directions is determined mainly by a combination of the light scattering characteristics of the scattering particles and the light scattering characteristics of a transparent substrate 32.

With reference to FIG. 4, a mechanism for generation of downward ghost rays of light by the comparative example will be explained. Most of rays of light to be projected 5M incident upon the refraction/total reflection region 1M located at the center of the transparent screen 100, the rays of light to be projected 5M being included in the beam of light that is emitted out of the projection optical system 4 and is then reflected by the plane mirror 2, are refracted by a plurality of refraction slating surface portions 11 or are refracted by a plurality of transmission slating surface portions 14 and are then reflected by a plurality of total reflection slating surface portions 13, as mentioned above. They are then incident upon an image formation/display plate 3 as regular rays of light to be projected 5MP parallel to the normal n to the refraction/total reflection plate, and become projected image rays of light 8 having proper light distribution characteristics. However, since scattering particles are dispersedly disposed in the volume of the refraction/total reflection plate 1, a part of the beam of light is reflected by the light-emitting-side surface 1R of the refraction/total reflection plate 1. This reflected beam of light travels in a slightly slanting upward direction, as a diffused and reflected ray of light 5MD, and is then reflected by the plane mirror 2 after passing through the light-incidence-side surface of the refraction/total reflection plate 1 again. The beam of light is further incident upon the refraction region 1L located at the lower or inner portion of the refraction/total reflection plate 1, passes through one refraction slating surface portion 11, is then reflected by one ineffective facet surface portion 12, and finally becomes a downward ghost ray of light 5MDS that is traveling below the regular image rays of light 8.

Furthermore, as shown in FIG. 4, a beam of light 5MR reflected by one transmission slating surface portion 14, the light beam being included in the rays of light to be projected 5M incident upon the refraction/total reflection region 1M, is incident upon the refraction/total reflection plate 1 again and is then reflected by the light-emitting-side surface 1R of the refraction/total reflection plate 1. The beam of light 5MR then exits from the refraction/total reflection plate 1, is reflected by the plane mirror 2, is incident upon the refraction region 1L located at the lower or inner portion of the refraction/total reflection plate 1, passes through one refraction slating surface portion 11, is then reflected by one ineffective facet surface portion 12, and finally becomes a downward ghost ray of light 5MRS that is traveling below the regular image rays of light 8.

The downward ghost rays of light 5MDS and 5MRS appear at a lower portion of the transparent screen 100 as compared with the position of the regular image rays of light 8, and become obstruction light that obstructs a watcher's view when the watcher watches the display image. It became clear by experiment that the intensity of the downward ghost rays of light has a tendency to increase with distance from the position of the regular image rays of light, that is, as their positions get closer to the lower side of the screen since the common axis line B of the sawtooth structure formed on the light-incidence-side surface of the refraction/total reflection plate 1 is located in the vicinity of the lower side of the refraction/total reflection plate 1, as shown in FIG. 2.

Next, with reference to FIG. 5, a mechanism for generation of upward ghost rays of light by the comparative example will be explained. Most of the rays of light to be projected 5L incident upon the refraction region 1 L located of the lower or inner portion of the transparent screen 100, the rays of light to be projected 5 L being included in the beam of light emitted out of the projection optical system 4 and reflected by the plane mirror 2, are refracted by the plurality of refraction slating surface portion 11s, are incident upon the image formation/display plate 3 as regular rays of light to be projected 5LP parallel to the normal n, and then become projected image rays of light 8 which have proper light-distribution characteristics.

However, after reflected by the light-emitting-side surface 1 R of the refraction/total reflection plate 1, a part of the rays of light to be projected 5L incident upon the plurality of ineffective facet surfaces 12 is divided into a part that is incident upon sawtooth surfaces located at the upper portion of the refraction/total reflection plate 1 again and then becomes double image rays of light 5LMD which travel toward the image formation/display plate 3, and another part that exits backwardly toward the plane mirror 2, is reflected by the plane mirror 2, and becomes upward ghost rays of light 5LMS that are incident upon of the upper portion of the image formation/display plate 3. Both the double image rays of light 5LMD which appear above the display image rays of light 8, and the upward ghost light rays of 5LMS which appear further above the double image rays of light become obstruction light that obstructs a watcher's view when the watcher watches the regular display image.

Next, a mechanism to reduce the intensity of ghost rays of light and the intensity of double image rays of light by using the transparent screen according to embodiment 1 of the present invention will be explained.

(1) A Mechanism to Reduce the Downward Ghost Rays of Light

In the comparative example, the downward ghost rays of light originate from i) a beam of light 5MD resulting from the dispersedly reflection in a slightly upward direction with respect to the normal n of light reflected by the light-emitting-side surface 1R of the refraction/total reflection plate 1 due to scattering particles contained in the refraction/total reflection plate 1, and ii) a beam of light 5MR reflected by one transmission slating surface portion 14, as shown in FIG. 4. On the other hand, in accordance with embodiment 1 of FIG. 1, the dispersion of the reflected light can be reduced while the reflection of the light-emitting-side surface of the refraction/total reflection plate 1 can be reduced and therefore the intensity of the above-mentioned light i), i.e., the beam of light 5MD can be remarkably reduced since the refraction/total reflection plate 1 is formed of a material which does not contain any scattering particle and the reflection reduction coating layer 17 used for reducing the reflectance of visible rays of light is disposed on the light-emitting-side surface of the refraction/total reflection plate 1.

Simultaneously, since the first lenticular lens unit 15 including a plurality of cylindrical lenses arranged in both the upward and downward directions is formed on the light-emitting-side surface of the refraction/total reflection plate 1, the plurality of optical elements formed on the refraction/total reflection plate 1 can be so constructed as to be non-rotation symmetric with respect to the common axis line B of the concentric circular members, as compared with the refraction/total reflection plate 1 of the comparative example having a simple concentric structure. As a result, since the density of rays of light which are incident upon the refraction region 1L at the lower or inner portion of the screen 100, the rays of light being included in the beam of light reflected by the refraction/total reflection plate 1, and which become the downward ghost rays of light can be reduced (that is, the rays of light can be dispersed), the problem that the intensity of the downward ghost rays of light increases as they appear at a location closer to the lower end of the screen can be solved.

In addition, in accordance with embodiment 1, since the reflection reduction coating layer 16 for reducing the reflectance of visible rays of light is formed on the light-incidence-side surface of the refraction/total reflection plate 1, the intensity of the reflected rays of light 5MR which is the above-mentioned problem light beam ii) can be remarkably reduced. As a result, the intensity of the downward ghost rays of light (i.e., the beams of light 5MDS and 5MRS of FIG. 4) can be reduced because of the structure of the transparent screen of FIG. 1.

(2) A Mechanism to Reduce the Upward Ghost Rays of Light

In the comparative example, as shown in FIG. 5, the upward ghost rays of light originate from rays of light each of which is incident upon one ineffective facet surface portion 12, is reflected by the light-emitting-side surface 1R of the refraction/total reflection plate 1, exits backwardly from a sawtooth surface located above a position where the light ray is incident upon the ineffective facet surface portion 12, is reflected by the plane mirror 2, and becomes a beam of light 5LMS which is incident upon a further upper portion of the image formation/display plate 3. On the other hand, in accordance with embodiment 1 of FIG. 1, the first lenticular lens unit 15 having the plurality of cylindrical lenses arranged in both the upward and downward directions on the light-emitting-side surface of the refraction/total reflection plate 1 is disposed for scattering rays of light which are incident upon the plurality of ineffective facet surfaces 12 and are then reflected by the light-emitting-side surface of the refraction/total reflection plate 1. In addition, the first lenticular lens units 15 can scatter the beam of light 5LMS which is reflected by the plane mirror 2 and passes through the refraction/total reflection plate 1 again. These two light scattering steps can make it possible to reduce the density of the upward ghost rays of light on the screen and therefore to reduce the visibility of the upward ghost rays of light.

(3) A Mechanism to Reduce the Double Image Rays of Light

In the comparative example, as shown in FIG. 5, the double image rays of light originate from rays of light each of which is incident upon one ineffective facet surface portion 12, is reflected by the light-emitting-side surface 1R of the refraction/total reflection plate 1, is incident upon a sawtooth surface located above again, and becomes a beam of light 5LMD which travels toward the image formation/display plate 3. On the other hand, in accordance with embodiment 1 of FIG. 1, the first lenticular lens unit 15 having the plurality of cylindrical lenses arranged in both the upward and downward directions on the light-emitting-side surface of the refraction/total reflection plate 1 is disposed for scattering undesired rays of light which are incident upon the plurality of ineffective facet surfaces 12 and are then reflected by the light-emitting-side surface of the refraction/total reflection plate 1. In addition, the first lenticular lens units 15 can scatter the beam of light 5LMD which is reflected by the light-emitting-side surface of the refraction/total reflection plate 1, is incident upon a sawtooth surface located above again, and passes through the refraction/total reflection plate 1 again. These two light scattering steps can make it possible to reduce the density of the double image rays of light on the screen and therefore to reduce the visibility of the double image rays of light.

EXAMPLE 1

Results of experiments that were carried out in order to check the above-mentioned effects by the inventors will be explained. FIG. 6A shows the experimental results obtained for various kinds of samples #1 to #4 of the refraction/total reflection plate 1. The first transparent substrate 18 is formed of acrylic for each of the plurality of samples #1 to #4. The sample #1 is equivalent to the refraction/total reflection plate 1 of the comparative example of the FIG. 4 in which neither the reflection reduction coating layers 16 and 17 nor the first lenticular lens unit 15 is disposed. The sample #4 is equivalent to the refraction/total reflection plate 1 according to embodiment 1 of FIG. 1 in which the reflection reduction coating layers 16 and 17 and the first lenticular lens unit 15 are disposed. While each of the reflection reduction coating layers 16 and 17 consists of a single-layer coating in the sample #2, each of the reflection reduction coating layers 16 and 17 consists of a two-layer coating in each of the samples #3 and #4. In other words, in each of the samples #3 and #4 each of the reflection reduction coating layers 16 and 17 has a first layer that is coated on the refraction/total reflection plate 1, and a second layer coated on the first layer.

FIG. 6B shows conditions for producing each of the plurality of samples of the refraction/total reflection plate 1. In the case where each of the reflection reduction coating layers 16 and 17 is a single-layer coating, each of the reflection reduction coating layers 16 and 17 has an index of refraction NL (1.43) lower than the index of refraction of 1.53 of the first transparent substrate 18 (formed of acrylic). In the case where each of the reflection reduction coating layers 16 and 17 is a two-layer coating, the first layer which constitutes each of the reflection reduction coating layers 16 and 17 has an index of refraction NH (1.67) higher than the index of refraction of 1.53 of the first transparent substrate 18, and the second layer which also constitutes each of the reflection reduction coating layers 16 and 17 has an index of refraction NL (1.43) lower than the index of refraction of 1.53 of the first transparent substrate 18. Each of the plurality of samples prepared for this experiment can be obtained by forming the sawtooth structural unit 19 (having the plurality of refraction slating surface portions 11, the plurality of ineffective facet surfaces 12, the plurality of total reflection slating surface portions 13, and the plurality of transmission slating surface portions 14) on the light-incidence-side surface of the first plate-shaped transparent substrate 18 made of acrylic with an ultraviolet-rays (UV) curing resin. The index of refraction of this UV curing resin is close to that of the plate-shaped transparent substrate 18 made of acrylic and is 1.55. Each of the plurality of cylindrical lenses which constitute the first lenticular lens unit 15 has a shape corresponding to one of halves into which an elliptic cylinder is divided by a plane parallel to the axis of the elliptic cylinder.

Then, for each of the plurality of samples #1 to #4 prepared, the brightness of the white aperture, the intensity of the downward ghost rays of light, the intensity of the upward ghost rays of light, and the degree of disturbance caused by the double image rays of light were measured. FIG. 6C shows concrete conditions for the measurement. The transparent screen 100 measured 60 inches (about 1524 mm) diagonally and was a rectangle having an aspect ratio of 4:3. In other words, the transparent screen 100 had a horizontal size of about 914 mm and a vertical size of about 1219 mm.

The projection optical system 4 was controlled so that the white aperture that was a square (having side of a length of 24 cm) was displayed on the center of the transparent screen 100. Then the brightness of the white aperture by projection of the regular rays of light to be projected and the intensity of the downward ghost rays of light were measured. As shown in FIG. 6C, this measurement was carried out for a case (i.e., a front observation) where a light intensity meter was located along the direction of the normal to the screen and for another case (i.e., a peeping observation) where the intensity meter was located along a slanting upward direction having a 20-degree angle with respect to the normal to the screen. A ratio of the brightness of the white aperture and the intensity of the downward ghost rays of light is entered in FIG. 6A, and it can be seen from the figure that the larger ratio, the smaller relative intensity the downward ghost rays of light have and hence the more desirable characteristics are obtained.

In the measurement carried out for the upward ghost rays of light, the projection optical system 4 was controlled so that the white aperture that was a square (having side of a length of 12 cm) was displayed on the center of the lower end of the transparent screen 100. The brightness of the white aperture by projection of the regular rays of light to be projected and the intensity of the upward ghost rays of light were then measured on the conditions as shown in FIG. 6C. A ratio of the brightness of the white aperture and the intensity of the upward ghost rays of light is entered in FIG.

6A, and it can be seen from the figure that the larger ratio, the smaller relative brightness the upward ghost rays of light have and hence the more desirable characteristics are obtained.

Figure 8C:
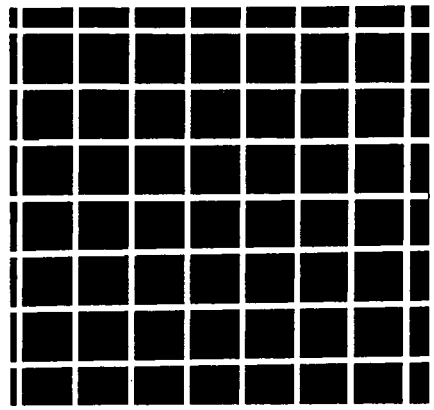
FIG. 8C is a diagram of a photograph of an image displayed on the transparent screen according to embodiment 1 of the present invention.
Figure 8B:
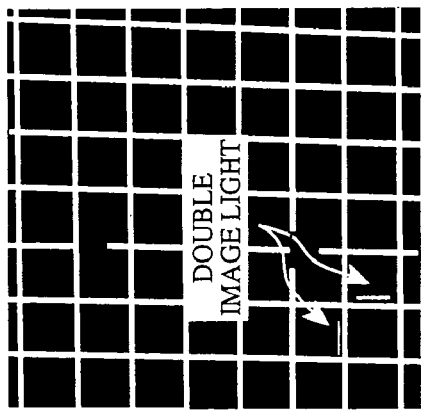
FIG. 8B is a diagram of a photograph of an improved image which is displayed on the transparent screen.
Figure 8A:
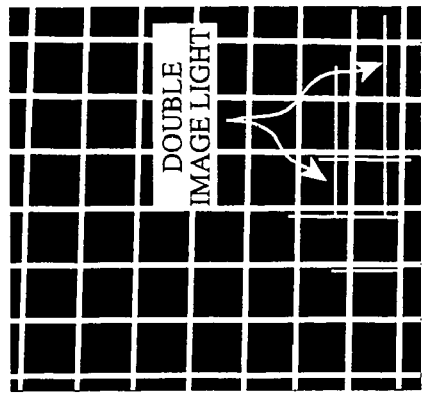
FIG. 8A is a diagram of a photograph of an image which is displayed on the transparent screen of the comparative example.

In the measurement carried out for the double image rays of light, the projection optical system 4 was controlled so that a cross hatching image (i.e., an image of two or more crossing lines as shown in FIG. 8A and so on) was displayed on the transparent screen 100 in order for a watcher to visually evaluate the double image rays of light, as shown in FIG. 6C. In FIG. 6A, a mark x shows that the regular image is disturbed much more than allowed for the double image rays of light and therefore the display image is of poor quality, whereas a mark O shows that the regular image is not disturbed much more than allowed for the double image rays of light and therefore the display image is of good quality.

FIG. 6A shows the following things:

(1) It is apparent from the comparison between the samples #1 and #2 that the respective provision of the reflection reduction coating layers 16 and 17 each consisting of a single layer on both the light-incidence-side surface and light-emitting-side surface of the refraction/total reflection plate 1 greatly reduces the intensity of the downward ghost rays of light (to about ⅓ of that in the case where no reflection reduction coating layer is formed on the refraction/total reflection plate 1). This is because both the intensity of the rays of light reflected by the plurality of sawtooth surfaces formed on the light-incidence-side surface of the refraction/total reflection plate 1 and the intensity of the rays of light reflected by the light-emitting-side surface of the refraction/total reflection plate 1 decrease, those reflected rays of light becoming the cause of the above-mentioned downward ghost rays of light.

(2) It is apparent from the comparison between the samples #2 and #3 that forming each of the reflection reduction coating layers 16 and 17 respectively disposed on both the light-incidence-side surface and light-emitting-side surface of the refraction/total reflection plate 1 in two layers greatly reduces the intensity of the downward ghost rays of light (to about ½ of that in the case where each of the reflection reduction coating layers 16 and 17 is a single-layer coating). This is because a two-layer coating can reduce the reflectance thereof more effectively as compared with a single-layer coating, and therefore both the intensity of the rays of light reflected by the sawtooth surfaces formed on the light-incidence-side surface of the refraction/total reflection plate and the intensity of the rays of light reflected by the light-emitting-side surface of the refraction/total reflection plate can be further reduced.

(3) It is apparent from the comparison between the samples #3 and #4 that forming the lenticular lens structure on the light-emitting-side surface of the refraction/total reflection plate 1 can reduce the relative intensity of the upward ghost rays of light to about 25% of that in the case where no lenticular lens structure is formed on the light-emitting-side surface of the refraction/total reflection plate, and the obstruction by the double image rays of light can be improved to an acceptable level for visualizing images. The inverters also recognized that the concentration of the intensity of the downward ghost rays of light, particularly in the vicinity of the lower end of the screen, can be reduced by visual observations, though not shown in FIG. 6A.

FIGS. 7A and 7B show photographs of the downward ghost rays of light for comparison between the above-mentioned samples #1 and #3. FIG. 7A shows a photograph of a square white aperture (having side of a length of 24 cm) displayed at the center of the transparent screen 100 which is shot from a point located in the direction of the normal to the white aperture, and FIG. 7B shows a photograph of the square white aperture displayed at the center of the transparent screen 100 which is shot from a point located in a slanting upward direction with respect to the white aperture. In each of FIGS. 7A and 7B, the left side shows the case (#1) where no coating is formed on the refraction/total reflection plate, and the right side shows the case (#3) where the two double-sided reflection reduction coating layers 16 and 17 each consisting of two layers are formed on both the light-incidence-side surface and light-emitting-side surface of the refraction/total reflection plate, respectively. It is apparent from those figures that the two coatings greatly reduce the intensity of the downward ghost rays of light.

FIGS. 8A, 8B, and 8C show photographs of the double image rays of light in the vicinity of the lower end of the screen for comparison among the above-mentioned samples #1, #3, and #4. It is apparent from FIGS. 8A, 8B, and 8C that when the first lenticular lens unit 15 is formed on the light-emitting-side surface of the refraction/total reflection plate 1, the intensity of the double image rays of light which appear in the case (sample #1) where no coating is formed on the refraction/total reflection plate and in the case (#3) where the two double-sided reflection reduction coating layers 16 and 17 each consisting of two layers are formed on both the light-incidence-side surface and light-emitting-side surface of the refraction/total reflection plate, respectively, decreases to a level which is hard for watchers to visually identify, and therefore the image quality is improved.

Though FIG. 6A shows the experiment data about only the case where the two reflection reduction coating layers 16 and 17 each consisting of a single layer or two layers are formed on both the light-incidence-side surface and light-emitting-side surface of the refraction/total reflection plate, respectively, the inventors also recognized that even when a reflection reduction coating is formed on only the light-incidence-side surface or light-emitting-side surface of the refraction/total reflection plate, a similar effect of reducing the downward ghost rays of light, which is inferior to that produced in the case of the double-sided coatings, is produced. Therefore, when the goal of reducing the downward ghost rays of light is set to a small one, or when no strong constraint is placed on reduction of the downward ghost rays of light, a coating layer (consisting of a single layer or two layers) can be formed on only the light-incidence-side surface or light-emitting-side surface of the refraction/total reflection plate 1.

Though in the projection optical system 4 of this embodiment, the convex mirror 4M is arranged as the last stage of the optical system, the optical system for use with the transparent screen is not limited to this example. Another proper optical system that is so constructed as to emit beams of light to be projected (designated by the reference characters 5L, 5M, and 5U) in an upward or downward slanting direction can be used in combination with the transparent screen 100 according to this embodiment. Therefore, a projection optical system provided only with a refractive lens, a projection optical system which is a combination of concavo and convex reflective mirrors, or a composite projection optical system which is a combination of a refractive lens and a reflective mirror falls within the scope of this invention.

As mentioned above, according to this embodiment 1, since the refraction/total reflection plate 1 is formed of a transparent material in which no scattering particle is dispersedly disposed, the transparent screen can prevent generation of diffused and reflected light from beams of light which are reflected from the light-emitting-side surface of the refraction/total reflection plate 1, thereby reducing the intensity of downward ghost rays of light.

When the refraction/total reflection plate 1 is provided with the nearly-plate-shaped first transparent substrate 18 and the sawtooth structural unit (i.e., refraction/total reflection structural unit) 19 disposed on the first transparent substrate 18, and the plurality of refraction slating surface portions 11, the plurality of transmission slating surface portions 14, and the plurality of total reflection slating surface portions 13 are formed on the sawtooth structural unit 19, each of the first transparent substrate 18 and the sawtooth structural unit 19 can be formed of a proper material. As a result, the productivity of the refraction/total reflection plate 1 can be improved and the strength of the refraction/total reflection plate 1 against shocks from outside the refraction/total reflection plate 1 as compared with the case where the refraction/total reflection plate 1 consists of only the transparent substrate 18.

Each of the plurality of refraction slating surface portions 11 of the refraction/total reflection plate 1 refracts an incident ray of light to be projected in the direction of nearly the normal to the transparent screen 100, and each of the plurality of total reflection slating surface portions 13 reflects an incident ray of light to be projected passing through a transmission slating surface portion 14 in the direction of nearly the normal to the transparent screen 100. Therefore, the transparent screen has a viewing angle centered in the direction of the normal to the screen 100.

The first lenticular lens unit 15 is formed on the light-emitting-side surface of the refraction/total reflection plate 1, and the two or more cylindrical lenses each of which is running in the horizontal direction are arranged in a line and along both the upward and downward directions in the first lenticular lens unit 15. Therefore, the rotation symmetry of beams of light reflected by the surfaces of the refraction/total reflection plate 1 can be broken and hence the downward ghost rays of light can be prevented from being concentrated in the vicinity of the lower end or inner-side portion of the transparent screen 100. The first lenticular lens unit 15 can diffuse undesired light rays on the light-emitting-side surface of the refraction/total reflection plate 1, thereby making the double image rays of light and the upward ghost rays of light be inconspicuous.

In addition, the image formation/display plate 3 is provided with the second lenticular lens unit 31 for diffusing the rays of light that exit from the refraction/total reflection plate 1 in the horizontal direction, and the second transparent substrate 32 for receiving the rays of light that exit from the second lenticular lens unit 31, the second lenticular lens unit 31 includes the two or more cylindrical lenses each of which is running in both the upward and downward directions and which are arranged in a line and along the horizontal direction, and the second transparent substrate 32 includes scattering particles dispersedly disposed therein for forming an image from the incident rays of light to be projected. Therefore, the transparent screen 100 has an image formation function of forming a projected image and proper horizontal viewing angle characteristics.

When the reflection reduction coating layer 16 for reducing the reflection of visible rays of light is formed on the light-incidence-side surface of the refraction/total reflection plate 1, the reflection by the refraction/total reflection structure formed on the light-incidence-side surface of the refraction/total reflection plate 1, particularly the reflection by the plurality of transmission slating surface portions 14, can be reduced and hence the intensity of the downward ghost rays of light can be reduced. On the other hand, when the reflection reduction coating layer 17 for reducing the reflection of visible rays of light is formed on the light-emitting-side surface of the refraction/total reflection plate 1, the reflection by the light-emitting-side surface of the refraction/total reflection plate 1 can be reduced and hence the intensity of the downward ghost rays of light can be reduced. When the reflection reduction coating layers 16 and 17 are formed on the light-incidence-side surface and light-emitting-side surface of the refraction/total reflection plate 1, respectively, the intensity of the downward ghost rays of light can be further reduced because of the effects of both the two reflection reduction coating layers.

When the reflection reduction coating layer 16 or 17 is a single-layer coating formed of a material having a lower index of refraction than that of the material of which the refraction/total reflection plate 1 is formed, the transparent screen that can reduce the intensity of the downward ghost rays of light can be manufactured at a low cost. On the other hand, when the reflection reduction coating layer 16 or 17 is a two-layer coating having the first layer which is coated on the refraction/total reflection plate 1 and is formed of a material having a higher index of refraction than that of the material of which the refraction/total reflection plate 1 is formed, and the second layer which is coated on the first layer and is formed of a material having a lower index of refraction than that of the material of which the refraction/total reflection plate 1 is formed, the intensity of the downward ghost rays of light can be further reduced.

Since the projection optical system 4 is located between the transparent screen 100 and the plane mirror 2 and below them in the projection display apparatus according to this embodiment, the adverse effect of the downward ghost rays of light, the upward ghost rays of light, and the double image rays of light can be reduced by the synergistic effect with the transparent screen 100. In addition, the rear projection display apparatus can be thinned because the projection optical system 4 is located between the transparent screen 100 and the plane mirror 2 and below them.

Embodiment 2

Figure 9:
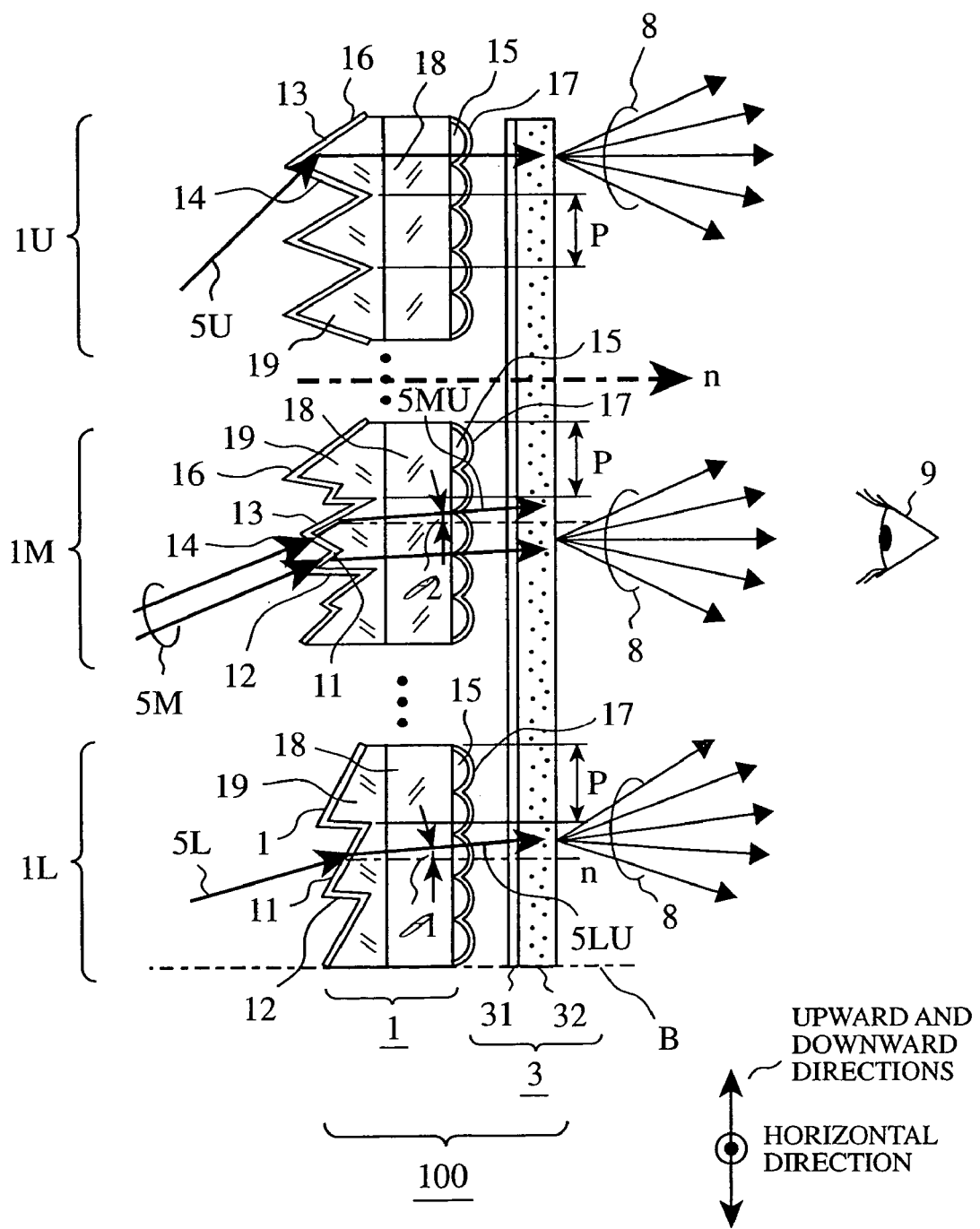
FIG. 9 is a vertical-cross-sectional view showing a transparent screen 100 according to embodiment 2 of the present invention.

FIG. 9 is a cross-sectional view showing a transparent screen 100 according to embodiment 2 of the present invention, and shows a vertical cross-sectional view of the transparent screen 100 as shown in FIG. 2, the view being taken along a central line A—A shown in FIG. 2 and passing through the transparent screen 100 in a vertical direction, like FIG. 1. In FIG. 9, the same components as shown in FIG. 1 are designated by the same reference numerals, and therefore the detailed explanation of those components will be omitted hereafter.

According to this embodiment, in both a refraction region 1L in the vicinity or a common axis line B of a plurality of circular members formed on a refraction/total reflection plate 1, and a refraction/total reflection region 1M, a plurality of refraction slating surface portions 11, a plurality of total reflection slating surface portions 13, and a plurality of transmission slating surface portions 14 are formed so that incident rays of light to be projected are made to travel in outward directions with respect to the normal n to the transparent screen 100. Therefore, in the vicinity of a lower side of the transparent screen 100, incident rays of light to be projected travel in slightly upward directions with respect to the normal n and then pass through the refraction/total reflection plate 1 and an image formation/display plate 3. In a total reflection region 1U that is the farthest away from the common axis line B, a plurality of total reflection slating surface portions 13 and a plurality of transmission slating surface portions 14 are formed so that incident rays of light to be projected travel in directions of nearly the normal n to the transparent screen 100.

In both the refraction region 1L and the refraction/total reflection region 1M, the plurality of refraction slating surface portions 11, the plurality of total reflection slating surface portions 13, and the plurality of transmission slating surface portions 14 are formed so that angles which the directions of travel of incident rays of light to be projected have with respect to the direction of the normal to the transparent screen 100, i.e., "upward light emitting angles" decrease with distance from the common axis line B (i.e., with distance from the lower side of the transparent screen). For example, as shown in FIG. 9, a ray of light to be projected 5L which is incident upon the refraction region 1L in the vicinity of the common axis line B is refracted by one refraction slating surface portion 11 and is then made to travel with an upward light emitting angle θ1 with respect to the normal n to the screen 100 (i.e., the ray of light to be projected 5L becomes a ray of light 5LU). A ray of light to be projected 5M incident upon the refraction/total reflection region 1M, which is farther away from the common axis line B than the refraction region 1L, is made to travel with an upward light emitting angle θ2 with respect to the normal n to the screen 100 by one refraction slating surface portion 11 or one total reflection slating surface portion 13 (i.e., ray of light to be projected 5M becomes a ray of light 5MU). The upward light emitting angle θ2 is smaller than the upward light emitting angle θ1. The other parts of the transparent screen 100 according to embodiment 2 have the same structures as those of embodiment 1.

Figure 10:
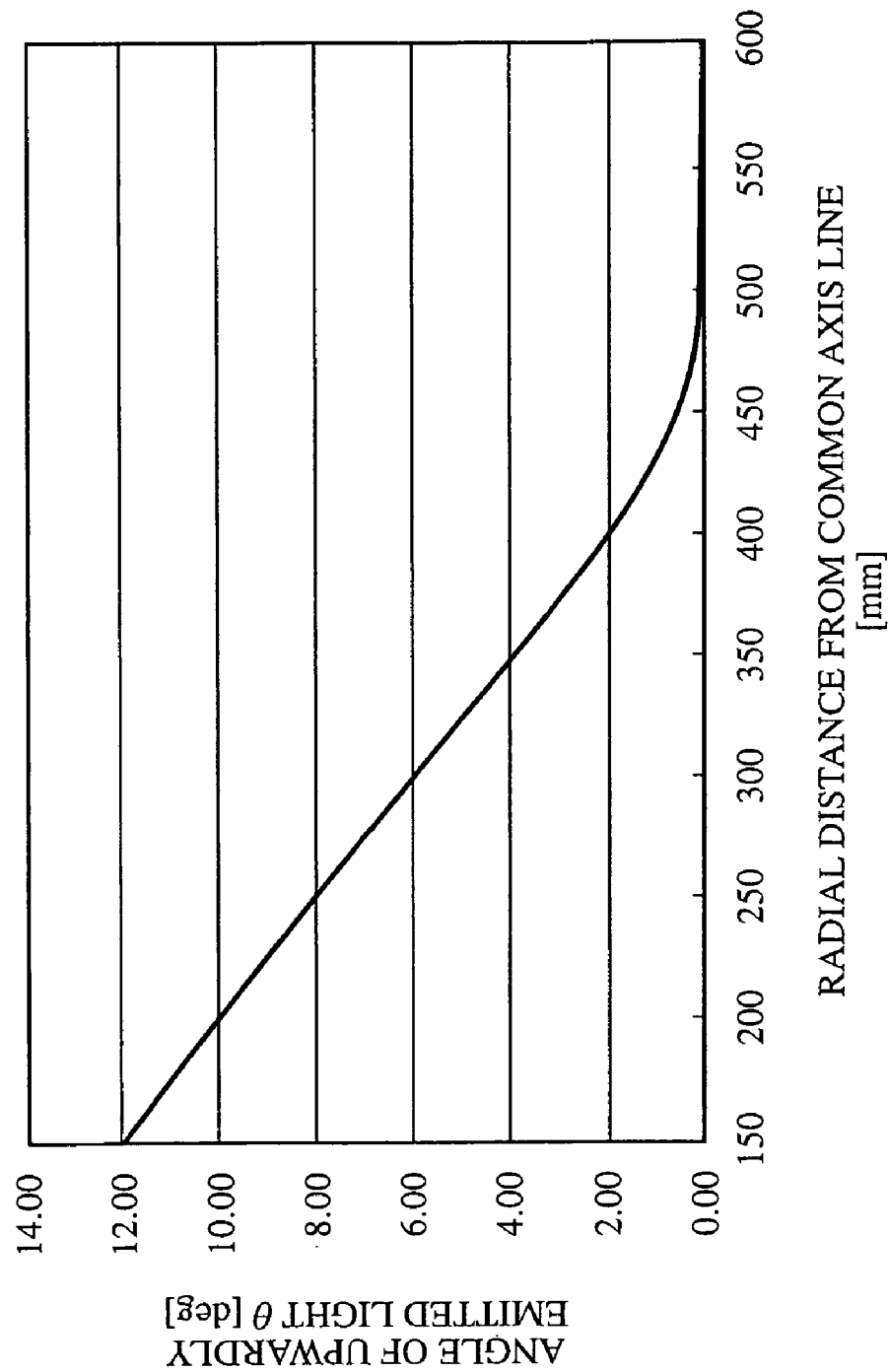
FIG. 10 is a graph showing target values of upward light emitting angles of a suitable refraction/total reflection plate according to embodiment 2.

FIG. 10 shows a relationship between the distance from the common axis line B of each of the plurality of circular member in the suitable refraction/total reflection plate 1 according to embodiment 2, and the corresponding upward light emitting angle θ. The transparent screen 100 measures 60 inches (about 1524 mm) diagonally and is a rectangle having an aspect ratio of 4:3. In other words, the transparent screen 100 has a horizontal size of about 914 mm and a vertical size of about 1219 mm. As shown in FIG. 10, in the suitable refraction/total reflection plate 1, the upward light emitting angle is changed slightly and linearly so that the upward light emitting angle θ increases with increasing proximity to the lower end of the screen (corresponding to a radius distance of 150 mm, in this example), and the upward light emitting angle θ becomes 0 degrees at a point (corresponding to a radius distance of about 450 mm, in this example) in the refraction/total reflection region 1M.

According to this embodiment, since rays of light which exit from the lower part of the refraction/total reflection plate 1 have large upward light emitting angles θ, the intensity of image rays of light from the lower part of the transparent screen 100 which a watcher 9 senses can be increased so that the watcher senses the intensity of the double image rays of light more weakly in comparison with the intensity of image rays of light. In the suitable refraction/total reflection plate 1 explained with reference to FIG. 10, since the upward light emitting angle θ is slightly changed with increasing proximity to the lower end of the screen, rapid variations in the brightness on the screen can be avoided. Although a half-moon-shaped island area may appear at the lower part of the screen due to rapid variations in the brightness when the upward light emitting angle is changed rapidly, such the malfunction can be prevented by properly adjusting the degree of the change in the upward light emitting angle with increasing proximity to the lower end of the screen.

As mentioned above, according to this embodiment 2, in the regions in the vicinity of the common axis line B of the refraction/total reflection plate 1, the plurality of slating surface portions are formed so that incident rays of light to be projected are made to travel in outward directions with respect to the normal to the transparent screen 100, and, in the region that is the farthest away from the common axis line B, the plurality of slating surface portions are formed so that incident rays of light to be projected are made to travel in directions of nearly the normal to the transparent screen 100. Therefore, the intensity of double image rays of light which occur in the vicinity of the lower end of the screen can be reduced relatively to the intensity of the regular image rays of light.

Furthermore, since in the region in the vicinity of the common axis line B, the upward light emitting angle θ is changed so that the angles which the directions of travel of incident rays of light to be projected have with respect to the direction of the normal to the transparent screen 100 decrease with distance from the common axis line B, variations in the brightness of the display image are not noticeable easily and the transparent screen can produce a display with good brightness homogeneity.

Embodiment 3

Figure 11:
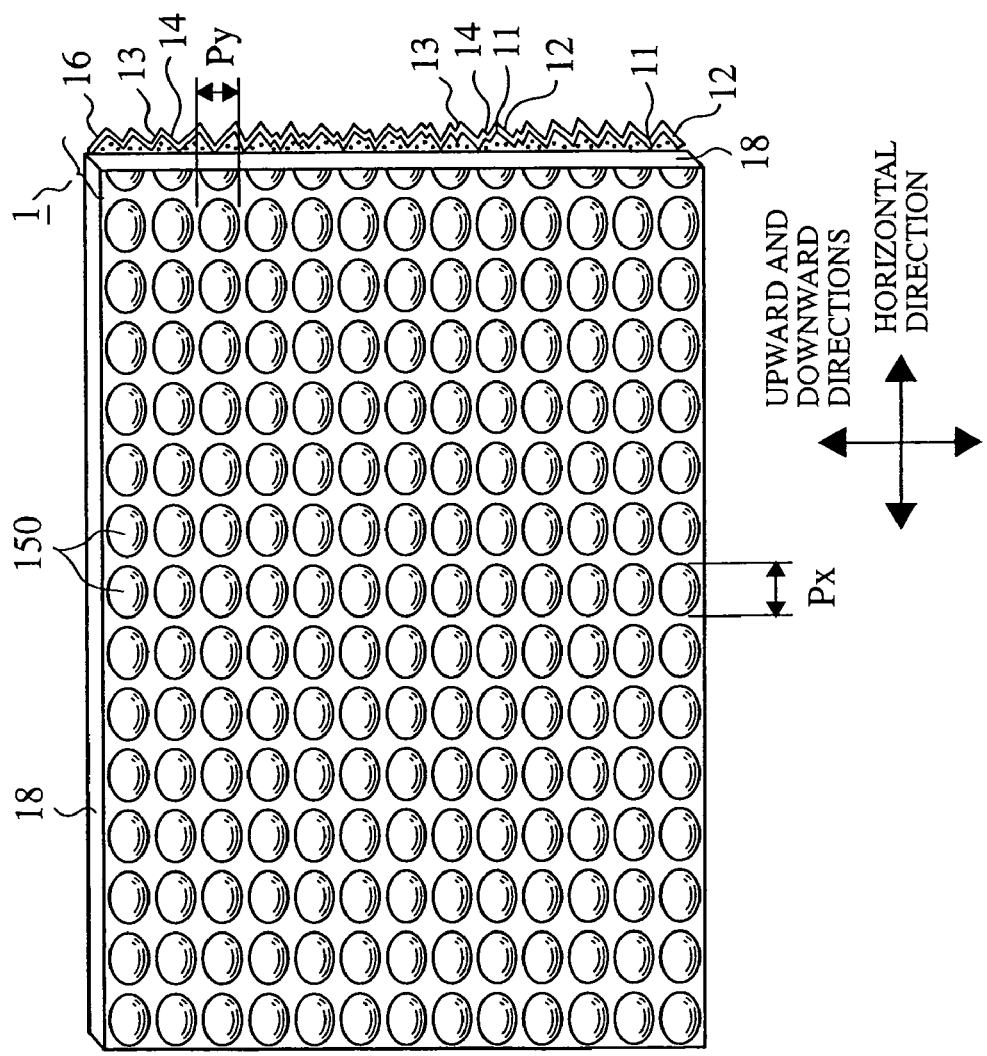
FIG. 11 is a perspective diagram showing a refraction/total reflection plate of a transparent screen according to embodiment 3 of the present invention which viewed from a light-emitting-side surface thereof.

FIG. 11 is a perspective diagram showing a refraction/total reflection plate 1 of a transparent screen according to embodiment 3 of the present invention when viewed from a side of a light emitting side surface thereof. The image formation/display plate 3 is not illustrated in the figure. In FIG. 11, the same components as shown in FIG. 1 are designated by the same reference numerals, and therefore the detailed explanation of those components will be omitted hereafter. In accordance with this embodiment 3, instead of the first lenticular lens unit 15 of embodiment 1, an array of plural micro lenses 150 is disposed on the light-emitting-side surface of the refraction/total reflection plate 1.

Each of the plurality of micro lenses 150 is a minute convex lens having a function of diffusing an incident ray of light that exits from the refraction/total reflection plate 1 in at least both vertical directions and horizontal directions. Each of the plurality of micro lenses 150 can have a shape corresponding to a part of a sphere, a part of an ellipsoid, a part of a hyperboloid, or a rectangular parallelepiped. Preferably, the plurality of micro lenses 150 are equal in both shape and size. As shown in FIG. 11, the plurality of micro lenses 150 can be so arranged that any two adjacent micro lenses 150 are clearly separated from each other. As an alternative, the plurality of micro lenses 150 can be continuously constructed so that any two adjacent micro lenses 150 are arranged without boundaries between them.

Those micro lenses 150 are arranged in both the vertical directions and the horizontal directions and at predetermined pitches. In the vertical directions, the plurality of micro lenses 150 are arranged at predetermined pitches of Py. In the horizontal directions, the plurality of micro lenses 150 are arranged at predetermined pitches of Px. An incident ray of light which exits from the refraction/total reflection plate 1 is diffused in both the vertical directions and the horizontal directions by each of the plurality of micro lenses 150.

The plurality of micro lenses 150 are formed of a transparent material, like the above-mentioned first lenticular lens unit 15. It is preferable that the plurality of micro lenses 150 are formed on a surface of a first transparent plate-shaped substrate 18 and of a material different from that of which the first transparent substrate 18 is formed in view of the difficulty of the fabrication of the refraction/total reflection plate. As a result, the refraction/total reflection plate 1 can be easily manufactured in quantity. For example, when the first transparent plate-shaped substrate 18 is formed of acrylic, the plurality of micro lenses 150 made of an ultraviolet-rays (UV) curing resin or another resin can be formed on one surface of the first transparent substrate 18. It is preferable that the first transparent substrate 18 and the plurality of micro lenses 150 have indexes of refraction which are close to each other as much as possible.

Although not illustrated, the refraction/total reflection plate 1 has a light-emitting-side surface containing the array of the plurality of micro lenses 150 and coated by a reflection reduction coating layer (corresponding to the above-mentioned reflection reduction coating layer 17 of FIG. 1) for reducing the reflectance of visible rays light incident thereupon from outside the refraction/total reflection plate 1. The reflection reduction coating layer can be either a single-layer coating which consists of a single layer or a two-layer coating which consists of two layers, too. In the case where the reflection reduction coating layer is a single-layer one, it is preferable that the reflection reduction coating layer is formed of a material having a lower index of refraction than that of the material of which the plurality of micro lenses 150 are formed and that of the material of which the refraction/total reflection plate 1 is formed. In the case where the reflection reduction coating layer is a two-layer one, it is preferable that the reflection reduction coating layer has a first layer that is coated on the plurality of micro lenses 150 and the refraction/total reflection plate 1, and is formed of a material having a higher index of refraction than that of the material of which the plurality of micro lenses 150 are formed and that of the material of which the refraction/total reflection plate 1 is formed, and a second layer which is coated on the first layer and is formed of a material having a lower index of refraction than that of the material of which the plurality of micro lenses 150 are formed and that of the material of which the refraction/total reflection plate 1 is formed.

The transparent screen of this embodiment can thus accomplish a reduction in the intensity of downward ghost rays of light, the intensity of upward ghost rays of light, and the intensity of double image rays of light because of the array of the plurality of micro lenses 150 disposed on the light-emitting-side surface of the refraction/total reflection plate 1. Next, a mechanism to reduce the intensity of downward ghost rays of light, the intensity of upward ghost rays of light, and the intensity of double image rays of light by using the transparent screen according to embodiment 3 of the present invention will be explained with reference to FIGS. 4 and 5 showing a comparative example.

(1) A Mechanism to Reduce the Downward Ghost Rays of Light

In accordance with this embodiment, since the array of the plurality of micro lenses 150 is formed on the light-emitting-side surface of the refraction/total reflection plate 1, the plurality of optical elements formed on the refraction/total reflection plate 1 can be so constructed as to be non-rotation symmetric with respect to the common axis line B of the concentric circular members, as compared with the refraction/total reflection plate 1 of the comparative example having a simple concentric structure. As a result, since the density of rays of light which are incident upon the refraction region 1L at the lower or inner portion of the screen 100, the rays of light being included in the beam of light reflected by the refraction/total reflection plate 1, and which become the downward ghost rays of light can be reduced (that is, the rays of light can be dispersed), the problem that the intensity of the downward ghost rays of light increases as they appear at a location closer to the lower end of the screen can be solved.

On the other hand, the dispersion of the reflected light can be reduced and therefore the intensity of dispersedly-reflected light (i.e., a ray of light 5MD of FIG. 4) resulting in a downward ghost ray of light can be reduced while the reflection of the light-emitting-side surface of the refraction/total reflection plate 1 can be reduced since the refraction/total reflection plate 1 is formed of a material which does not contain any scattering particle and the reflection reduction coating layer for reducing the reflectance of visible rays of light is disposed on the light-emitting-side surface of the refraction/total reflection plate 1. In addition, since the reflection reduction coating layer 16 for reducing the reflectance of visible rays of light is formed on the light-incidence-side surface of the refraction/total reflection plate 1, the intensity of reflected rays of light 5MR can be remarkably reduced. As a result, the intensity of the downward ghost rays of light (i.e., the beams of light 5MDS and 5MRS of FIG. 4) can be reduced.

(2) A Mechanism to Reduce the Upward Ghost Rays of Light

In accordance with this embodiment, the array of the plurality of micro lenses 15 formed on the light-emitting-side surface of the refraction/total reflection plate 1 is disposed for scattering rays of light which are incident upon a plurality of ineffective facet surfaces 12 and are then reflected by the light-emitting-side surface of the refraction/total reflection plate 1. In addition, the array of the plurality of micro lenses 15 can scatter a beam of light 5LMS (see FIG. 5) which is reflected by a plane mirror 2 and passes through the refraction/total reflection plate 1 again. These two light scattering steps can make it possible to reduce the density of the upward ghost rays of light on the screen and therefore to reduce the visibility of the upward ghost rays of light.

(3) A Mechanism to Reduce the Double Image Rays of Light

In accordance with this embodiment, the array of the plurality of micro lenses 15 formed on the light-emitting-side surface of the refraction/total reflection plate 1 is disposed for scattering undesired rays of light which are incident upon the plurality of ineffective facet surfaces 12 and are then reflected by the light-emitting-side surface of the refraction/total reflection plate 1. In addition, the array of the plurality of micro lenses 150 can scatter a beam of light 5LMD (see FIG. 5) which is reflected by the light-emitting-side surface of the refraction/total reflection plate 1, is incident upon a sawtooth surface located above again, and passes through the refraction/total reflection plate 1 again. These two light scattering steps can make it possible to reduce the density of the double image rays of light on the screen and therefore to reduce the visibility of the double image rays of light.

As mentioned above, according to this embodiment 3, the same advantages as offered by embodiment 1 or similar advantages can be provided. In this embodiment, the array of the plurality of micro lenses 150, which is provided instead of the first lenticular lens unit 15, can break the rotation symmetry of beams of light reflected by the surfaces of the refraction/total reflection plate 1 and can therefore prevent the downward ghost rays of light from being concentrated in the vicinity of the lower end or inner-side portion of the transparent screen 100. The plurality of micro lenses 150 can also diffuse undesired beams of light on the light-emitting-side surface of the refraction/total reflection plate 1, thereby reducing the visibility of the double image rays of light and the upward ghost rays of light.

In accordance with this embodiment 3, the plurality of slating surface portions disposed on the light-incidence-side surface of the refraction/total reflection plate 1 are so formed that incident beams of light travel in different directions, as explained in embodiment 2.

Embodiment 4

Figure 12:
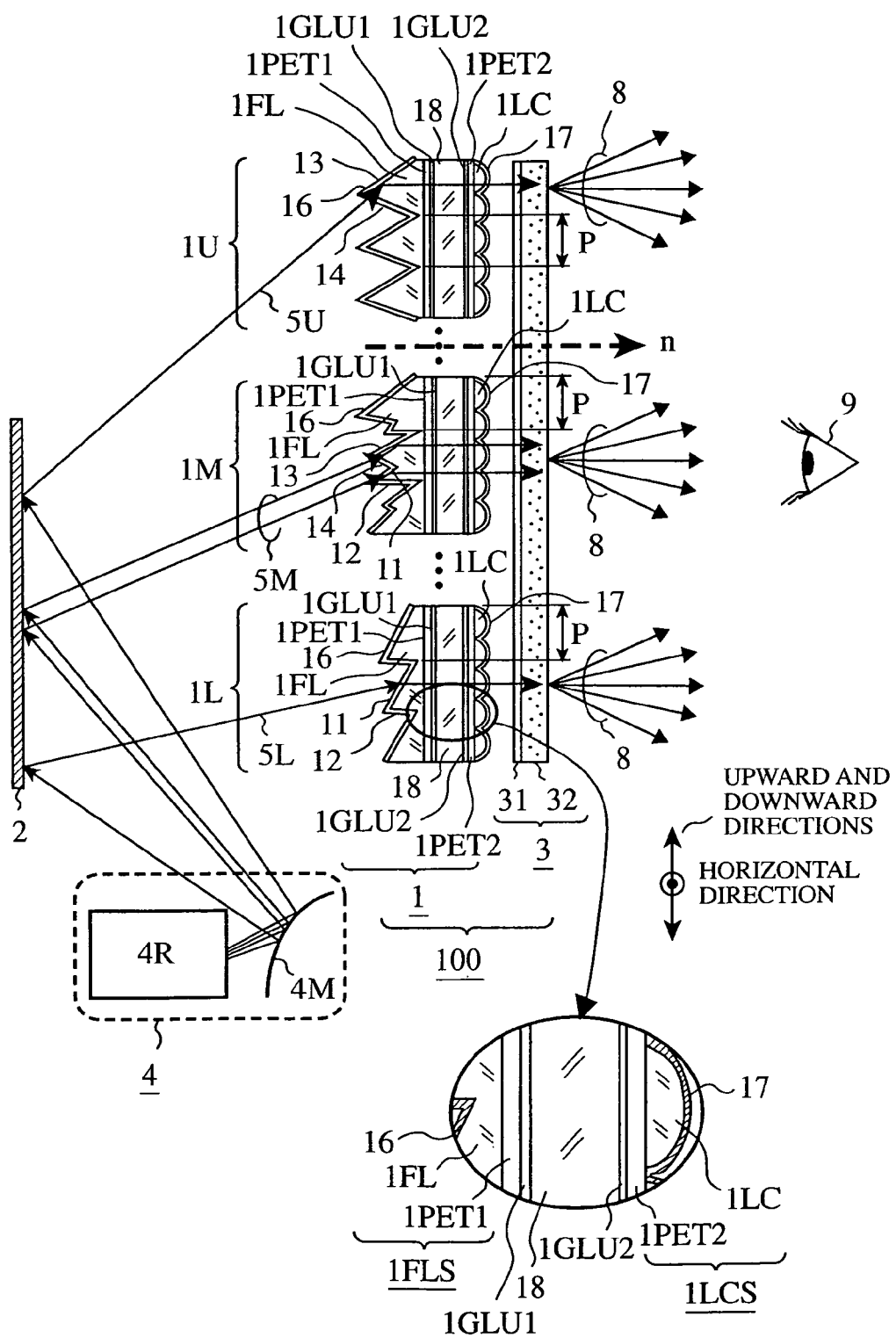
FIG. 12 is a schematic diagram showing a projection display apparatus provided with a transparent screen according to embodiment 4 of the present invention.

FIG. 12 is a schematic diagram showing a projection display apparatus provided with a transparent screen 100 according to embodiment 4 of the present invention. FIG. 12 shows a vertical cross-sectional view of the transparent screen 100 as shown in FIG. 2, the view being taken along a central line A—A shown in FIG. 2 and passing through the transparent screen 100 in a vertical direction. In FIG. 12, the same components as shown in FIG. 1 are designated by the same reference numerals, and therefore the detailed explanation of those components will be omitted hereafter.

In accordance with embodiment 4, a first plate-shaped transparent substrate 18 formed of a glass is used as the nucleus of a refraction/total reflection plate 1 in order to reduce displacements of an on-screen image due to a deformation of the refraction/total reflection plate 1. The refraction/total reflection plate 1 having the same shape as that according to any one of the above-mentioned other embodiments can be manufactured by sticking members formed of another material to both the surfaces of the first transparent substrate 18 formed of a glass with glue.

As can be seen from an enlarged view shown in FIG. 12, the refraction/total reflection plate 1 of this embodiment 4 has the first transparent substrate 18, a refraction/total reflection seat (i.e., a transparent total reflection structural unit) 1FLS, and a lenticular lens seat 1LCS. The refraction/total reflection seat 1FLS has a pet material seat 1PET1, a refraction/total reflection film 1FL formed on one surface of the pet material seat 1PET1, and a reflection reduction coating layer 16 provided on one surface of the refraction/total reflection film 1FL, for reducing the reflection of incident light.

The pet material seat 1PET1 is a plate-shaped transparent thin film formed of polyethylene terephthalate and is used as a base (i.e., a supporting layer) on which the refraction/total reflection film 1FL is formed. The refraction/total reflection film 1FL is formed of a transparent UV curing resin, and a plurality of sawtooth circular members 11, which have the same shapes as those according to any one of the above-mentioned other embodiments, i.e., a plurality of refraction slating surface portions, a plurality of ineffective facet surfaces 12, a plurality of total reflection slating surface portions 13, and a plurality of transmission slating surface portions 14 are formed in the refraction/total reflection film 1FL. The refraction/total reflection film 1FL can be formed by placing a UV curing resin on the pet material seat 1PET1, forming it into a plurality of sawtooth circular members, and irradiating them with ultraviolet rays of light so as to cure the resin.

It is preferable that the first transparent substrate 18 and the pet material seat 1PET1 have indexes of refraction that are close to that of the refraction/total reflection film 1FL as much as possible. The reflection reduction coating layer 16 can be either a single-layer coating which consists of a single layer or a two-layer coating which consists of two layers. In the case where the reflection reduction coating layer 16 is a single-layer one, it is preferable that the reflection reduction coating layer 16 is formed of a material having a lower index of refraction than that of the material of which the refraction/total reflection film 1FL is formed. In the case where the reflection reduction coating layer 16 is a two-layer one, it is preferable that the reflection reduction coating layer 16 has a first layer that is coated on the refraction/total reflection film 1FL, and is formed of a material having a higher index of refraction than that of the material of which the refraction/total reflection film 1FL is formed, and a second layer which is coated on the first layer and is formed of a material having a lower index of refraction than that of the material of which the refraction/total reflection film 1FL is formed.

Similarly, the lenticular lens seat 1LCS has a pet material seat 1PET2, a lenticular lens film 1LC formed on one surface of the pet material seat 1PET2, and a reflection reduction coating layer 17 formed on one surface of the lenticular lens film 1LC, for reducing the reflection of incident light.

The pet material seat 1PET2 is a plate-shaped transparent thin film formed of polyethylene terephthalate and is used as a base (i.e., a supporting layer) on which the lenticular lens film 1LC is formed. The lenticular lens film 1LC is formed of a transparent UV curing resin, and a plurality of members having the same outline shape as a first lenticular lens unit 15 (see FIGS. 1 and 9) or an array of micro lenses 150 according to any one of the above-mentioned other embodiments are formed in the lenticular lens film 1LC. The lenticular lens film 1LC can be formed by placing a UV curing resin on the pet material seat 1PET2, forming it into the plurality of members, and irradiating them with ultraviolet rays of light so as to cure the resin.

It is preferable that the first transparent substrate 18 and the pet material seat 1PET2 have indexes of refraction that are close to that of the lenticular lens film 1LC as much as possible. The reflection reduction coating layer 17 can be either a single-layer coating which consists of a single layer or a two-layer coating which consists of two layers.

The refraction/total reflection seat 1FLS is secured to one surface of the first transparent substrate 18 by an adhesive layer 1GLU1 which consists of transparent glue, and the lenticular lens seat 1LCS is secured to one surface of the first transparent substrate 18 by an adhesive layer 1GLU2 which consists of transparent glue.

Figure 13:
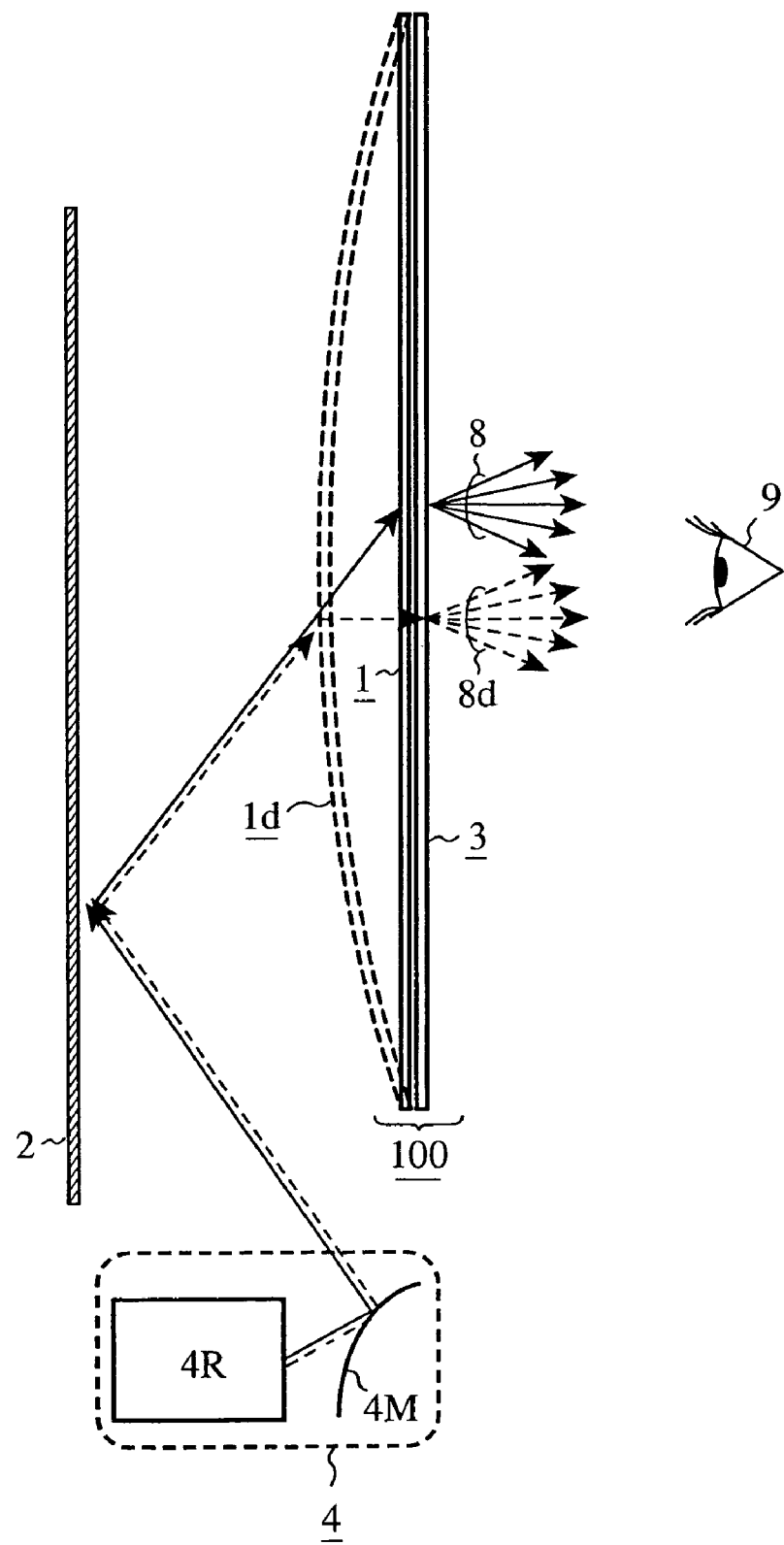
FIG. 13 is a diagram for explaining an effect provided by the transparent screen according to embodiment 4.

Next, an effect produced by the transparent screen according to embodiment 4 will be explained with reference to FIG. 13. In this type of transparent screen, there is a possibility that the image displayed on the transparent screen 100 may undergo large displacements due to a slight deformation of the refraction/total reflection plate 1. For example, since the transparent screen 100 is held in a state in which its peripheral portion is surrounded by a not-shown apparatus's housing, when an elongation occurs in the refraction/total reflection plate 1 due to a change in the ambient temperature or the like, the refraction/total reflection plate 1 will become deformed and enter a state 1d as shown by a virtual dotted line of FIG. 13. Especially, the central part of the refraction/total reflection plate 1 which is not secured to anything has a large deformation. When such a deformation appears in the refraction/total reflection plate 1, the display position of the image on the transparent screen 100 shifts in such a manner that a display image ray of light 8 as shown in FIG. 13 shifts to a position 8d, for example. Since the displacement of the display position of the image on the transparent screen 100 is dependent on the degree of deformation, in the transparent screen 100, portions in which a large deformation appears have a large displacement of the display position of the image while portions in which a small deformation appears has a small displacement of the display position of the image.

In accordance with this embodiment 4, it is possible to select a material for the first plate-shaped transparent substrate 18 that is readily formable independently on a material suitable for the refraction/total reflection seat 1FLS and the lenticular lens seat 1LCS that are comparatively difficult to form. Then, by using the first transparent substrate 18 formed of a glass which is a material that only slightly expands and contracts with temperature changes, as the nucleus of the refraction/total reflection plate 1, the deformation of the refraction/total reflection plate 1 and hence the displacement of the display position of the image can be reduced. For example, the glass has about 9 (1/K: K is the absolute temperature) of coefficient of linear expansion, whereas the acrylic has about 100 (1/K) of coefficient of linear expansion. In other words, the coefficient of linear expansion of the glass is about one-tenth of that of the acrylic. Furthermore, the glass has a high strength against pressure from outside as compared with the acrylic, and a glass plate of high flatness can be manufactured easily. It is therefore noted that the glass is a material suitable for reducing the displacement of the display position of the image resulting from the deformation of the screen.

Figure 14:
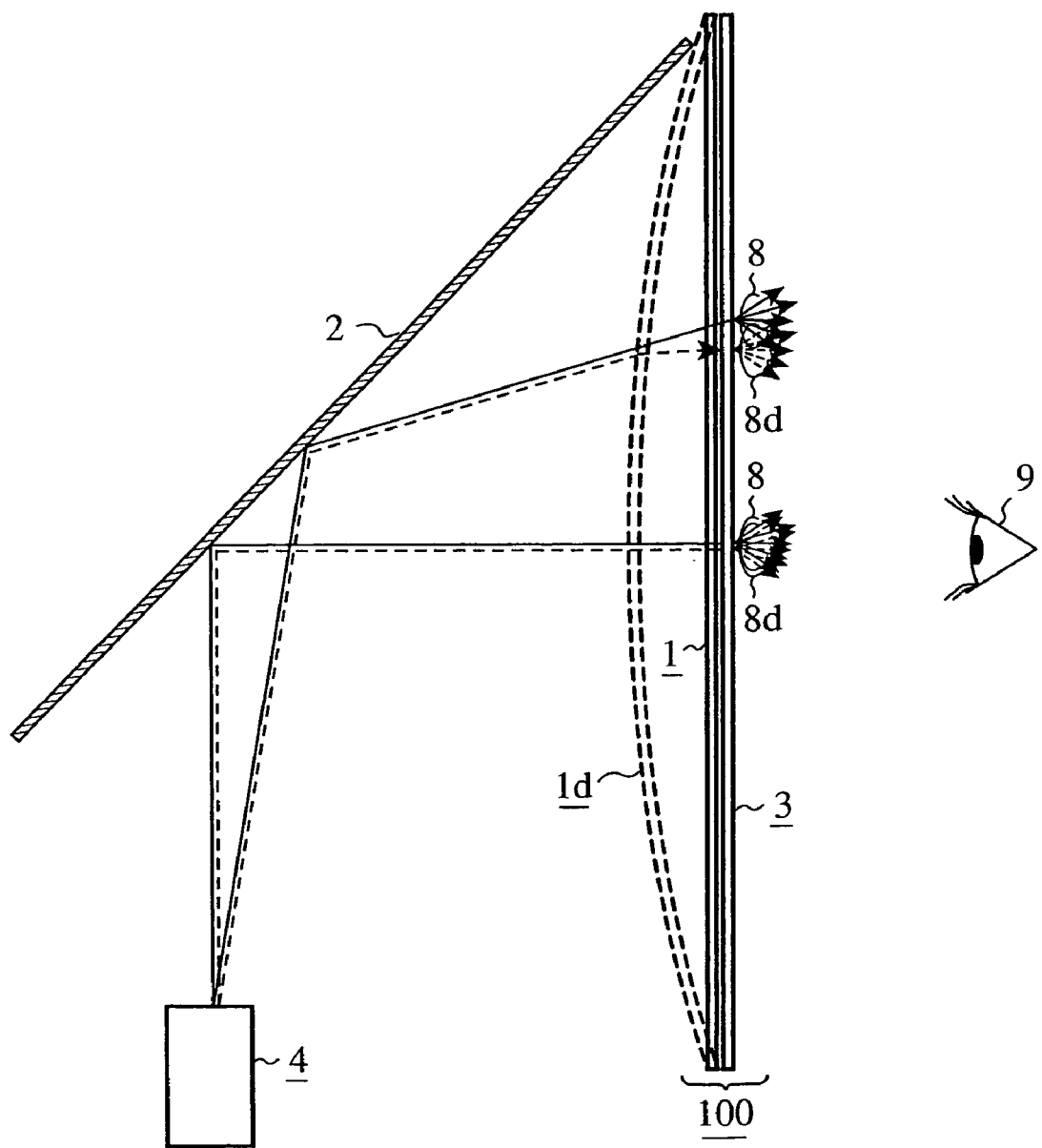
FIG. 14 is a schematic diagram showing a projection display apparatus having another arrangement to which a transparent screen according to this invention is applied, and is the diagram for explaining the effect provided by the transparent screen according to embodiment 4.

The transparent screen according to any one of embodiments 1 to 4 of the present invention can be applied to a projection display apparatus having an arrangement as shown in FIG. 14. In the projection display apparatus as shown in FIG. 14, the plane mirror 2 is placed so as to be opposite to the transparent screen 100, and to be inclined with respect to the transparent screen 100 in such a manner that the higher portion of the plane mirror, the closer to the transparent screen 100. When viewed in a horizontal plane, the projection optical system 4 is located between the plane mirror 2 and the transparent screen 100. The projection optical system 4 is also located below the plane mirror 2 and the transparent screen 100 so as to emit a beam of light to be projected in an upward and nearly vertical direction.

Even in the projection display device of the arrangement shown in FIG. 14, when an elongation occurs in the refraction/total reflection plate 1 due to a change in the ambient temperature or the like, the refraction/total reflection plate 1 will become deformed and enter a state 1d as shown by a virtual dotted line of FIG. 14. The display position of the image on the transparent screen 100 shifts in such a manner that a display image ray of light 8 as shown in FIG. 14 shifts to a position 8d, for example. In the arrangement of FIG. 14, the same degree of deformation causes a smaller displacement of the display position of the image, as compared with the arrangement of FIG. 13. However, there is a possibility that the displacement of the display position of the image is conspicuous depending on the degree of deformation. In contrast, since the refraction/total reflection plate 1 according to this embodiment 4 is constructed as above, for the same reason as previously mentioned, by using the first transparent substrate 18 formed of a glass which is a material that only slightly expands and contracts with temperature changes, as the nucleus of the refraction/total reflection plate 1, the deformation of the first transparent substrate 18 and hence the displacement of the display position of the image can be reduced.

As mentioned above, this embodiment 4 provides an advantage of making it possible to select a material for the first plate-shaped transparent substrate 18 that is readily formable independently on a material suitable for the refraction/total reflection seat 1FLS and the lenticular lens seat 1LCS that are comparatively difficult to form, and another advantage of being able to reduce the deformation of the refraction/total reflection plate 1 and hence the displacement of the display position of the image, by using the first transparent substrate 18 formed of a glass which is a material that only slightly expands and contracts with temperature changes, as the nucleus of the refraction/total reflection plate 1, in addition to the advantages provided by the above-mentioned other embodiments.

In addition, since the first transparent substrate 18 is formed of a glass, the transparent substrate 18 can be easily acquired and can be easily manufactured at a low cost, and the flatness of the first transparent substrate 18 can be improved.

The first transparent substrate 18 formed of a glass is apt to splinter if it is used singly. However, in accordance with this embodiment, since the first transparent substrate 18 is so constructed as to be sandwiched by the refraction/total reflection seat 1FLS and the lenticular lens seat 1LCS, the first transparent substrate 18 is impervious to breaking due to a shock from outside the refraction/total reflection plate. Therefore, the yield at the time of manufacturing the components of the transparent screen and assembling them into the transparent screen can be improved greatly.

Even in this embodiment 4, the first transparent substrate 18 can be formed of a material other than the glass. For example, in case that the projection display apparatus is used on the stipulation that a small change in the ambient temperature can occur, it is possible to form the first transparent substrate 18 with a synthetic resin, such as acrylic, having a larger coefficient of linear expansion than the glass. When the transparent substrate 18 is formed of acrylic, the transparent substrate 18 can be easily acquired and can be easily manufactured at a low cost, and the first transparent substrate 18 can be slimmed down.

In accordance with any one of above-mentioned embodiments 1 to 4, the refraction/total reflection plate 1 has the refraction region 1L, the refraction/total reflection region 1M, and the total reflection region 1U. As an alternative, the refraction/total reflection plate according to the present invention can have only the refraction and total reflection region 1M and the total reflection region 1U, or only the refraction region 1L and the refraction/total reflection region 1M. Computer simulations can be done in order to determined the concrete structure of the refraction/total reflection plate can be determined based on various parameters, such as the angles of rays of light to be projected from the projection optical system 4 with the transparent screen, desired angles of rays of light that exit from the refraction/total reflection plate, desired efficiency, etc.

Although the present invention has been described in its preferred form with a certain degree of particularity and with reference to the accompanying drawings, it is understood by those skilled in the art that various changes in the form and minor details of construction may be made in the invention without departing from the spirit and scope thereof. Such changes, replacements, and modifications are therefore intended to be embraced by the claims.

INDUSTRIAL APPLICABILITY

As mentioned above, the transparent screen according to this invention can reduce obstruction light and can offer a high-definition projected image.

The invention claimed is:

1. A transparent screen comprising:
    a refraction/total reflection plate in a form of a Fresnel lens, the refraction/total reflection plate having a sawtooth light-incidence-side surface upon which light to be projected is incident, and a light-emitting-side surface via which the light to be projected exits; and an image formation/display plate for forming a projected image from light that exits from said refraction/total reflection plate, a plurality of refraction slating surface portions each for refracting an incident ray of light to be projected towards said light-emitting-side surface of said refraction/total reflection plate, a plurality of transmission slating surface portions each for making an incident ray of light to be projected pass therethrough, and a plurality of total reflection slating surface portions each for reflecting an incident ray of light passing through one of said plurality of transmission slating surface portions towards said light-emitting-side surface of said refraction/total reflection plate being formed concentrically on the sawtooth light-incidence-side surface of said refraction/total reflection plate, and said refraction/total reflection plate being formed of a transparent material in which no scattering particles are dispersedly disposed.

2. The transparent screen according to claim 1, characterized in that said refraction/total reflection plate is provided with a first transparent substrate that is nearly plate-shaped and a refraction/total reflection structural unit disposed on said first transparent substrate, and said plurality of refraction slating surface portions, said plurality of transmission slating surface portions, and said plurality of total reflection slating surface portions are formed in said refraction/total reflection structural unit.

3. The transparent screen according to claim 1, characterized in that each of said plurality of refraction slating surface portions refracts an incident ray of light to be projected in a direction of nearly a normal to said transparent screen, and each of said plurality of total reflection slating surface portions reflects an incident ray of light after refracted by one of said plurality of transmission slating surface portions to be projected in the direction of nearly the normal to said transparent screen.

4. The transparent screen according to claim 1, characterized in that a first lenticular lens unit is disposed on the light-emitting-side surface of said refraction/total reflection plate, and said first lenticular lens unit has two or more cylindrical lenses that are extending horizontally and are arranged in upward and downward directions.

5. The transparent screen according to claim 4, characterized in that said first lenticular lens unit is formed of a material different from that of which said refraction/total reflection plate is formed, and is disposed on the flat light-emitting-side surface of said refraction/total reflection plate.

6. The transparent screen according to claim 1, characterized in that an array of micro lenses each for diffusing an incident ray of light in many directions is disposed on the light-emitting-side surface of said refraction/total reflection plate.

7. The transparent screen according to claim 1, characterized in that said image formation/display plate is provided with a second lenticular lens unit for horizontally diffusing the light that exits from said refraction/total reflection plate, and a second transparent substrate for receiving the light diffused by said second lenticular lens unit, and characterized in that said second lenticular lens unit is provided with two or more cylindrical lenses that are extending in upward and downward directions and are arranged in a horizontal direction, and said second transparent substrate includes scattering particles dispersedly arranged therein for forming an image from the light to be projected.

8. The transparent screen according to claim 1, characterized in that a reflection reduction coating layer for reducing reflection of visible light is formed on the light-incidence-side surface of said refraction/total reflection plate.

9. The transparent screen according to claim 8, characterized in that said reflection reduction coating layer is a single-layer coating formed of a material having a lower index of refraction than that of the transparent material of which said refraction/total reflection plate is formed.

10. The transparent screen according to claim 8, characterized in that said reflection reduction coating layer is a two-layer coating having a first layer that is coated on said refraction/total reflection plate and is formed of a material having a higher index of refraction than that of the transparent material of which said refraction/total reflection plate is formed, and a second layer that is coated on said first layer and is formed of a material having a lower index of refraction than that of the transparent material of which said refraction/total reflection plate is formed.

11. The transparent screen according to claim 1, characterized in that a reflection reduction coating layer for reducing reflection of visible light is formed on the light-emitting-side surface of said refraction/total reflection plate.

12. The transparent screen according to claim 1, characterized in that a reflection reduction coating layer for reducing reflection of visible light is formed on each of the light-incidence-side and light-emitting-side surfaces of said refraction/total reflection plate.

13. The transparent screen according to claim 1, characterized in that said refraction/total reflection plate has a first region in which slating surface portions are formed so that incident rays of light to be projected are made to travel outwardly with respect to a direction of a normal to said the transparent screen, said first region being located in a vicinity of a common axis which said plurality of refraction slating surface portions, said plurality of transmission slating surface portions, and said plurality of total reflection slating surface portions have in common, and a second region in which slating surface portions are formed so that incident rays of light to be projected are made to travel in a direction of nearly the normal to said the transparent screen, said second region being located farther away from said common axis than said first region.

14. The transparent screen according to claim 13, characterized in that in said first region, said slating surface portions are formed so that the farther away from said common axis the incident rays of light to be projected are incident upon, the smaller angle the incident rays of light to be projected have with respect to the direction of the normal to said transparent screen.

15. A projection display apparatus characterized in that said projection display apparatus comprises:

a projection optical system for emitting out a beam of light to be projected that enlarges as it travels;

a transparent screen according to claim 1; and a plane mirror for reflecting the beam of light to be projected from said projection optical system toward said transparent screen, and characterized in that said projection optical system is located between said transparent screen and said plane mirror, and below them.

* * * * *